(12) United States Patent
Harwood et al.

(10) Patent No.: US 7,810,362 B2
(45) Date of Patent: Oct. 12, 2010

(54) RECIRCULATION CONTROL IN A WASHING MACHINE

(75) Inventors: Jonathan David Harwood, Auckland (NZ); Hugh Griffith Johnson, Auckland (NZ); Geoffrey Alan Lee, Auckland (NZ); Gregory Paul Hill, Auckland (NZ); Anna Kathryn Duncan, Auckland (NZ); Adrian Anthony Sargeant, Redland Bay (AU)

(73) Assignee: Fisher & Paykel Appliances Ltd., Auckland (NZ)

( * ) Notice: Subject to any disclaimer, the term of this patent is extended or adjusted under 35 U.S.C. 154(b) by 644 days.

(21) Appl. No.: 11/556,827

(22) Filed: Nov. 6, 2006

(65) Prior Publication Data
US 2007/0113595 A1 May 24, 2007

Related U.S. Application Data

(60) Provisional application No. 60/748,235, filed on Dec. 7, 2005.

(30) Foreign Application Priority Data
Nov. 4, 2005 (NZ) .................................. 543428

(51) Int. Cl.
*D06F 39/04* (2006.01)
*D06F 39/08* (2006.01)

(52) U.S. Cl. .................... 68/12.19; 8/158; 68/12.01; 68/12.23

(58) Field of Classification Search ............ 8/158; 68/12.01, 12.19, 12.23
See application file for complete search history.

(56) References Cited

U.S. PATENT DOCUMENTS

| 3,851,993 | A | | 12/1974 | Foster |
| 3,949,578 | A | | 4/1976 | Heldreth |
| 4,091,644 | A | | 5/1978 | Bochan |
| 5,313,964 | A | * | 5/1994 | Dausch et al. ............ 134/57 D |
| 5,330,580 | A | | 7/1994 | Whipple, III et al. |
| 6,167,733 | B1 | | 1/2001 | Lee |
| 2004/0078902 | A1 | | 4/2004 | McGill et al. |

(Continued)

FOREIGN PATENT DOCUMENTS

DE 3811547 10/1989

(Continued)

OTHER PUBLICATIONS

European Search Report Dated Mar. 7, 2007; Six (6) Pages.

(Continued)

*Primary Examiner*—Michael Barr
*Assistant Examiner*—David Cormier
(74) *Attorney, Agent, or Firm*—Clark Hill PLC

(57) ABSTRACT

The present invention relates to a washing machine (7) and pump (8) for a washing machine (7). The pump is driven by a brushless DC motor (38). The pump can be controlled to improve the operation of the washing machine. In one aspect the invention comprises a washing machine (7) with a variable speed pump (8) for pumping out wastewater, a controller (50) for controlling the speed of the pump and a sensor (10) for determining the flow-rate of water being pumped from the washing machine, wherein the controller (50) controls the speed of the pump to maintain the flow-rate at a desirable level.

6 Claims, 20 Drawing Sheets

U.S. PATENT DOCUMENTS

2005/0073278 A1    4/2005    Marioni

FOREIGN PATENT DOCUMENTS

| | | |
|---|---|---|
| DE | 3821727 | 1/1990 |
| DE | 38 25 500 | 2/1990 |
| DE | 3828039 | 2/1990 |
| DE | 4017975 | 7/1991 |
| DE | 4418721 | 11/1995 |
| DE | 4437346 | 3/1996 |
| DE | 196 30 357 | 2/1998 |
| DE | 19810221 | 9/1999 |
| DE | 10002687 | 7/2001 |
| EP | 0226858 | 7/1987 |
| EP | 0 838 192 | 4/1998 |
| EP | 1411164 | 4/2004 |
| EP | 1 574 161 | 9/2005 |
| GB | 1 200 197 | 7/1970 |
| GB | 2 269 396 | 2/1994 |
| GB | 2 274 343 | 7/1994 |
| GB | 2 308 621 | 7/1997 |
| JP | 01276485 | 11/1989 |
| JP | 09234297 | 9/1997 |
| JP | 10201990 | 8/1998 |
| JP | 2004173744 | 6/2004 |
| JP | 2005087466 | 4/2005 |
| WO | 00/29660 | 5/2000 |
| WO | 2005/070275 | 8/2005 |
| WO | 2005/089621 | 9/2005 |

OTHER PUBLICATIONS

International Search Report Completed on Apr. 2, 2007; Nine (9) Pages.

* cited by examiner

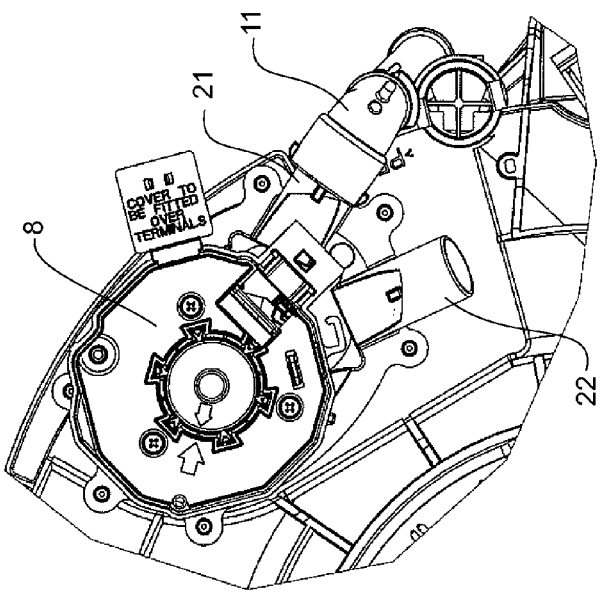
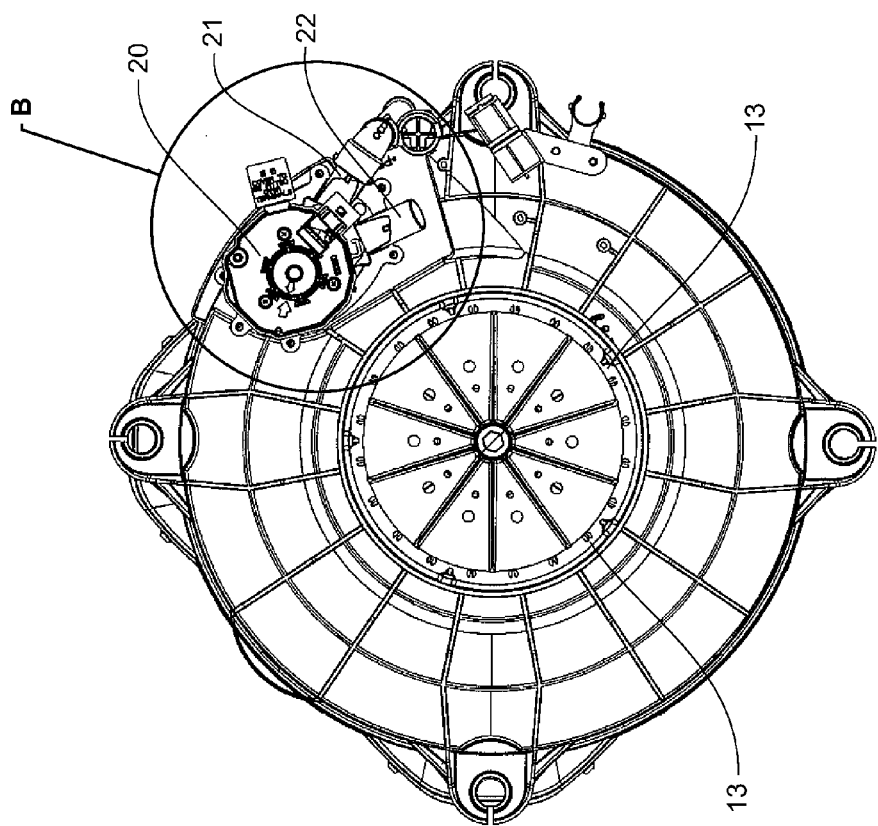
FIGURE 4b
FIGURE 4a

RECIRCULATION CONTROL IN A WASHING MACHINE

CROSS-REFERENCE AND INCORPORATION BY REFERENCE

This application claims the benefit of U.S. provisional patent application Ser. No. 60/748,235, entitled "Improvements Relating to Washing Machines" filed on Dec. 7, 2005, which is hereby incorporated by reference.

FIELD OF THE INVENTION

The present invention relates to improvements in the control of washing machines. In particular, the invention relates to, although is not limited to, the use of a brushless DC motor to drive a pump in a washing machine, and the operation of the pump in various ways to provide various functionality in the washing machine.

BACKGROUND TO THE INVENTION

In existing washing machines, pumps are used for recirculation and draining of wash water. The motors typically used for such pumps provide minimal control over operation of the pump.

SUMMARY OF THE INVENTION

It is an object of the invention to provide for improved control of a washing machine pump, and/or improved features of a washing machine pump itself.

In one aspect the present invention may be said to consist in a washing machine adapted to drain water at a preferred flow-rate comprising: a bowl adapted to hold water, a variable speed pump adapted to drain water from the bowl, a sensor adapted to sense one or more parameters that can be utilised to determine the drain flow-rate of water from the bowl, a controller adapted determine the drain flow rate using the one or more sensed parameters and adapted to control the speed of the punp, and a store adapted to store data defining a preferred drain flow-rate, wherein the controller is adapted to control the speed of the pump to drain water at a preferred flow-rate as defined by data in the store.

Preferably the data defining a preferred drain flow-rate defines one or more preferred flow-rates.

Preferably the data defines a range of preferred flow-rates.

Preferably the data defines a range of preferred flow-rates of 15 to 25 litres per minute.

Preferably the sensor is a pressure sensor that can sense the water pressure at multiple instants in the bowl and wherein the water pressure at an instant indicates the water level in the bowl and wherein the controller is adapted to calculate the drain flow-rate of water from the bowl from the change in water level in the bowl.

Preferably the sensor senses current drawn by the pump at multiple instants and wherein the controller is adapted to calculate the drain flow-rate of water from the bowl from the change in current drawn by the pump.

Preferably the controller is adapted to control the speed of the pump by: calculating the drain flow-rate of water from the bowl, comparing the calculated drain flow-rate with a preferred drain flow-rate defined by data stored in the store, increasing the pump speed if the drain flow-rate is less than a preferred drain flow-rate, and decreasing the pump speed if the drain flow-rate is more than a preferred drain flow-rate.

Preferably the controller is adapted to alter the data to define a new speed when the speed of the pump is increased or decreased.

In another aspect the present invention may be said to consist in a method of controlling a washing machine comprising a bowl and a variable speed pump for draining water from the bowl, the method comprising: sensing one or more parameters that can be utilised to determine the drain flow-rate of water from the bowl, calculating the drain flow-rate of water from the bowl using the one or more sensed parameters, comparing the calculated drain flow-rate with a preferred drain flow-rate defined by stored data, increasing the pump speed using a controller if the drain flow-rate is less than a preferred drain flow-rate, and decreasing the pump speed using a controller if the drain flow-rate is more than a preferred drain flow-rate.

Preferably the data defining a preferred drain flow-rate defines one or more preferred flow-rates.

Preferably the data defines a range of preferred flow-rates.

Preferably the data defines a range of preferred flow-rates of 15 to 25 litres per minute.

Preferably the one or more parameters are sensed at multiple instants in the bowl using a water pressure sensor.

Preferably the one or more parameters indicate current drawn by the pump at multiple instants.

In another aspect the present invention may be said to consist in a washing machine comprising a bowl for holding water, a bowl adapted to hold water, a spin basket nested within the bowl such that a space is defined between an outer water of the spin basket and an inner wall of the bowl, a variable speed pump adapted to pump water into the bowl and/or spin basket, a controller adapted to control the speed of the pump, and wherein the controller is adapted to increase the speed of the pump to pump water into the spin basket, and the controller is adapted to decrease the speed of the pump to pump water on to the outer wall of the spin basket to remove debris.

Preferably the controller is adapted to increase the speed of the pump to a first speed to pump water into the spin basket, and the controller is adapted to decrease the speed of the pump to a second speed to pump water on to the outer wall of the spin basket to remove debris.

Preferably the first speed is 2000 rpm and the second speed is 1000 rpm or 600 rpm In another aspect the present invention may be said to consist in a method for removing debris from a spin basket of a washing machine, the spin basket being nested in a bowl, the method comprising: operating a pump to pump water into the spin basket by increasing the speed of the pump, and operating the pump to pump water onto an outer wall of the spin basket to remove debris by decreasing the speed of the pump.

Preferably to pump water into the spin basket the pump is operated at a first speed, and to pump water on to the outer wall of the spin basket to remove debris the pump is operated a second speed.

Preferably the first speed is 2000 rpm and the second speed is 1000 rpm or 600 rpm In one aspect the present invention may be said to consist in a washing machine comprising: a bowl adapted to hold water, an inlet with a valve adapted for connection to a water supply, the inlet and valve allowing controlled introduction of water into the bowl when the inlet is connected to a water supply, a variable speed pump adapted to recirculate water within the bowl, a sensor adapted to measure one or more parameters indicative of current drawn by the pump during operation, a controller adapted to control the speed of the pump and to control introduction of water into the bowl by controlling the valve, and wherein the controller is adapted to: receive input from the sensor and determine pump current from the one or more parameters indicative of current, detect ventilation if the pump current is less than a threshold, and reduce the speed of or stop the pump and/or introduce water into the bowl if ventilation is detected in order to reduce the effects of ventilation.

Preferably the threshold is a 20% reduction in pump current from a reference value.

Preferably if the controller detects ventilation, the controller is adapted to:

stop the pump, increase the ventilation timer, determine a measure of a pump timer value with respect to a ventilation timer value, and operate the valve to introduce water into the bowl based on a first relationship of the measure to a first threshold.

Preferably the controller is further adapted to: start the pump upon operating the valve to introduce water into the bowl, increase the pump timer, determine a measure of the pump timer value with respect to the ventilation timer value, and operate the valve to prevent introduction water into the bowl based on a second relationship of the measure to a second threshold.

Preferably the measure is the ratio of the pump timer value to the ventilation timer value, and the first relationship is the ratio of the pump timer value to ventilation timer value exceeding the first threshold.

Preferably second relationship is the ratio of the pump timer value to ventilation timer value exceeding the second threshold.

Preferably the ventilation timer and pump timer are implemented in the controller.

In another aspect the present invention may be said to consist in a method of alleviating the effects of ventilation in a washing machine comprising a bowl adapted to hold water and a variable speed pump adapted to recirculate water within the bowl, the method comprising: sensing one or more parameters indicative of current drawn by the pump during operation, determining pump current from the one or more parameters indicative of current, detecting ventilation if the pump current is less than a threshold, and reducing the speed of or stopping the pump and/or introducing water into the bowl if ventilation is detected in order to reduce the effects of ventilation.

Preferably the threshold is a 20% reduction in pump current from a reference value.

Preferably the method comprises increasing a ventilation timer upon stopping the pump, determining a measure of a pump timer value with respect to a ventilation timer value, and operating a valve in an inlet coupled to a water supply to introduce water into the bowl based on a first relationship of the measure to a first threshold.

Preferably the method comprises starting the pump upon operating the valve to introduce water into the bowl, increasing the pump timer, determining a measure of the pump timer value with respect to the ventilation timer value, and operating the valve to prevent introduction water into the bowl based on a second relationship of the measure to a second threshold.

Preferably the measure is the ratio of the pump timer value to the ventilation timer value, and the first relationship is the ratio of the pump timer value to ventilation timer value exceeding the first threshold.

Preferably second relationship is the ratio of the pump timer value to ventilation timer value exceeding the second threshold.

In another aspect the present invention may be said to consist in a washing machine comprising: a pump operated by a motor, the pump adapted to pump water within the washing machine, a sensor adapted to sense one or more parameters of the motor that can be utilised to determine the motor speed, and a controller coupled to the sensor and the motor, the controller adapted to: determine the motor speed using the one or more sensed parameters, detect a blockage in the pump when the motor speed falls below a threshold speed, and control the motor to dislodge the blockage when a blockage is detected.

Preferably the threshold speed is zero.

Preferably the motor is a stepper motor.

Preferably the controller is adapted to control the motor to dislodge the blockage by stopping the motor and then restarting the motor by applying a first excitation.

Preferably the controller is further adapted to: re-determine the motor speed using the one or more sensed parameters, re-detect a blockage in the pump if the motor speed falls below a threshold speed, and control the motor to dislodge the blockage by stopping the motor a second time and restarting the motor by applying a second excitation that promotes a higher average current to provide a higher torque than the first excitation.

Preferably the controller is further adapted to: re-determine the motor speed using the one or more sensed parameters, re-detect a blockage in the pump if the motor speed falls below a threshold speed, and control the motor to dislodge the blockage if a blockage is re-detected by stopping the motor a third time and stepping the motor backwards.

Preferably the controller is further adapted to control the motor to dislodge the blockage by restarting the motor.

Preferably the controller is further adapted to: re-determine the motor speed using the one or more sensed parameters, re-detect a blockage in the pump if the motor speed falls below a threshold speed, and control the motor to dislodge the blockage if a blockage is re-detected by stopping the motor a fourth time and restarting the motor.

Preferably the sensor is a back emf sensor from which motor commutation rate is inferred, wherein the motor commutation rate indicates motor speed, and wherein the controller detects a blockage in the pump when the motor speed falls below a threshold speed by detecting when the motor commutation rate falls below exceeds a threshold rate.

In another aspect the present invention may be said to consist in a method for dislodging a blockage in a water pump in a washing machine, the water pump being operated by a motor, the method comprising: sensing one or more parameters of the motor that can be utilised to determine the motor speed, determining the motor speed using the one or more sensed parameters, detecting a blockage in the pump when the motor speed falls below a threshold speed, and controlling the motor to dislodge the blockage if a blockage is detected.

Preferably the threshold speed is zero.

Preferably the motor is a stepper motor.

Preferably controlling the motor to dislodge the blockage comprises stopping the motor and then restarting the motor by applying a first excitation.

Preferably a method according to the claims further comprising: re-determining the motor speed using the one or more sensed parameters, re-detecting a blockage in the pump if the motor speed falls below a threshold speed, and controlling the motor to dislodge the blockage if a blockage is re-detected by stopping the motor a second time and restarting the motor by applying a second excitation that promotes a higher average current to provide a higher torque than the first excitation.

Preferably the method comprises re-determining the motor speed using the one or more sensed parameters, re-detecting a blockage in the pump if the motor speed falls below a threshold speed, and controlling the motor to dislodge the blockage if a blockage is re-detected by stopping the motor a third time and stepping the motor backwards.

Preferably the method comprises controlling the motor to dislodge the blockage by restarting the motor.

Preferably the method comprises re-determining the motor speed using the one or more sensed parameters, re-detecting a blockage in the pump if the motor speed falls below a threshold speed, and controlling the motor to dislodge the blockage if a blockage is re-detected by stopping the motor a fourth time and restarting the motor.

Preferably the one or more sensed parameters are motor back emf wherein the motor back emf indicates motor commutation rate which motor speed, and wherein a blockage is detected in the pump when the motor speed falls below a threshold speed by detecting when the motor commutation rate fall below a threshold rate.

In another aspect the present invention may be said to consist in a washing machine comprising a pump operated by a motor, a controller for controlling rotation of the pump, and a speed sensor for sensing speed of the pump rotor, wherein zero speed indicates a blockage in the impeller, wherein upon detecting zero speed the controller can control the motor of the pump to step the motor in reverse to dislodge the blockage.

In another aspect the present invention may be said to consist in a method of controlling a washing machine with a pump operated by a motor, the method comprising sensing the speed of the pump rotor, wherein upon detecting zero speed indicates a blockage, the method further comprising controlling the motor of the pump to step the motor in reverse to dislodge the blockage.

In another aspect the present invention may be said to consist in a washing machine with a bowl adapted to hold water in an interior portion, the washing machine comprising: a pump coupled to the bowl and adapted to pump water from the bowl, the pump comprising: a housing coupled to or integrated with the bowl, an outlet in the housing coupled to a recirculation conduit for recirculation of water to the bowl interior, a pump actuator disposed in the housing for transferring water to the outlet and recirculation conduit, and a conduit to provide fluid communication between the exterior of the housing and the outlet to substantially equalise water pressure such that water in the recirculation conduit does not rise above the water level in the washing machine bowl.

Preferably the pump actuator is an impeller and the pump further comprises a motor arranged to rotate the impeller.

Preferably the outlet protrudes from the housing and has an outer wall defining an interior portion in fluid communication with the housing, wherein the outlet comprises an aperture in the outer wall and further comprising housing cover on which the conduit is disposed wherein the housing and the housing cover are arranged such that the conduit is aligned to provide fluid communication between the interior of the bowl and the interior portion of the outlet.

In another aspect the present invention may be said to consist in a washing machine pump for installation in a washing machine with a bowl adapted to hold water in an interior portion, the pump being adapted to be coupled to the bowl and to pump water from the bowl, the pump comprising: a housing for coupling to the bowl, an outlet in the housing adapted to be coupled to a recirculation conduit of a washing machine for recirculation of water to the bowl interior, a pump actuator disposed in the housing for transferring water to the outlet and recirculation conduit, and a conduit to provide fluid communication between the exterior and the outlet interior to substantially equalise pressure in the outlet with ambient pressure.

Preferably the pump actuator is an impeller and the pump further comprises a motor arrange to rotate the impeller.

Preferably the outlet protrudes from the housing and has an outer wall defining an interior portion in fluid communication with the housing interior, wherein the outlet comprises an aperture in the outer wall and further comprising a housing cover on which the conduit is disposed wherein the housing and the housing cover are arranged such that the conduit is aligned to provide fluid communication between ambient pressure and the interior portion of the outlet.

In another aspect the present invention may be said to consist in a washing machine pump comprising a housing with a recirculation outlet and a housing cover adapted for coupling to a washing machine bowl, the housing cover comprising a conduit for providing fluid communication between the housing and a washing machine bowl on which the pump is installed to equalise water pressure an interior portion of the bowl and an interior of the housing.

In another aspect the present invention may be said to consist in a washing machine pump comprising a housing adapted to be installed on the exterior of a washing machine bowl, the housing having a recirculation and a drain outlet, a valve disposed in the housing to alternately abut against and close the drain and recirculation outlets, and a housing cover adapted to be installed in a washing machine bowl, the housing cover comprising a conduit providing fluid communication between the housing and a washing machine bowl on which the pump is installed to reduce unseating forces of the valve when abutted against the recirculation or drain outlets.

In another aspect the present invention may be said to consist in a washing machine pump comprising: a housing for coupling to the bowl of a washing machine, the housing comprising a interior for an impeller, an impeller rotatably disposed in the interior, and one or more outlets in the housing, wherein the impeller comprises a first set of impeller blades positioned on a first surface that are adapted to transfer water through the outlets upon rotation of the impeller, and the impeller comprises a second set of impeller blades positioned on a second surface, the second set of impeller blades being adapted to create a vortex in the housing to emit debris from the impeller that is on or adjacent the second surface.

Preferably first surface is a top surface of the impeller and the second surface is a bottom surface of the impeller and wherein the recess comprising a bearing and wherein the impeller rotates on a bearing adjacent the bottom surface.

Preferably the impeller is second set of impeller blades comprises one or more elongated protrusions extending radially on the bottom surface.

In another aspect the present invention may be said to consist in a washing machine pump for a washing machine, the pump comprising a rotatable impeller with vanes on the upper surface to pump water, and vanes on the underside that, during operation, produce a centrifugal action that emits foreign objects from the impeller assembly.

In another aspect the present invention may be said to consist in a washing machine pump for installation in a washing machine with a bowl adapted to hold water in an interior portion, the pump being adapted to be coupled to the bowl and to pump water from the bowl, the pump comprising: a housing for coupling to the bowl such and a housing cover with an aperture, the housing and housing cover arranged to define a housing interior that is in fluid communication with the bowl interior via the aperture, and a filter for filtering water entering the housing interior via the aperture, wherein the filter comprises a profiled wall extending from the housing cover and encircling the aperture to define a volute around the aperture, and wherein the filter comprises a hood disposed above the wall, the hood having a perimeter, said perimeter have a profile substantially corresponding with that of the profiled wall to allow for a profiled space between the perimeter and the profiled wall, wherein the profiled space allows water to enter the volute but substantially prevents elongated objects entering the volute.

Preferably the profiled wall is shaped to provide an exterior shape is substantially non-planar in shape.

Preferably the profiled wall is shaped to provide angular portions in the exterior shape.

Preferably the profiled wall is shaped to provide curved portions in the exterior shape.

In another aspect the present invention may be said to consist in a washing machine with a bowl adapted to hold water in an interior portion, the washing machine comprising: a pump coupled to the bowl and adapted to pump water from the bowl, the pump comprising: a housing coupled the bowl and a housing cover with an aperture, the housing and housing cover arranged to define a housing interior that is in fluid communication with the bowl interior via the aperture, and a filter for filtering water entering the housing interior via the aperture, wherein the filter comprises a profiled wall extending from the housing cover and encircling the aperture to define a volute around the aperture, and wherein the filter comprises a hood disposed above the wall, the hood having a perimeter, said perimeter have a profile substantially corresponding with that of the profiled wall to allow for a profiled space between the perimeter and the profiled wall, wherein the profiled space allows water from the bowl to enter the volute but substantially prevents elongated objects from the bowl entering the volute.

Preferably the profiled wall is shaped to provide an exterior shape is substantially non-planar in shape.

Preferably the profiled wall is shaped to provide angular portions in the exterior shape.

Preferably the profiled wall is shaped to provide curved portions in the exterior shape.

In another aspect the present invention may be said to consist in a pump for a washing machine comprising an inlet filter for filtering water entering the pump, the filter formed from a profiled wall forming a volute around the inlet to the pump, and a hood disposed above the wall, the hood having a lip around the perimeter, said perimeter have a profile commensurate with that of the wall, but allowing for a shaped space between the inside of the lip and the profiled wall, such that water can enter the volute, but the shaped space preventing elongated objects entering the volute.

In one aspect the present invention may be said to consist in a washing machine pump for installation in a washing machine with a bowl adapted to hold water in an interior portion, the pump being adapted to be coupled to the bowl and to pump water from the bowl, the pump comprising: a housing for coupling to the bowl, the housing having an interior, an impeller disposed in the interior, a motor for driving the impeller, a housing cover comprising a first aperture for fluid communication to the housing interior and comprising a wall extending from the housing cover and encircling the first aperture to define a volute around the first aperture, and a hood disposed above the wall, the hood comprising a second aperture for venting air bubbles.

Preferably comprising a bulb in the hood for accommodating air bubbles, wherein the second aperture is in the bulb.

Preferably the bulb is adapted to accommodate lint.

Preferably the bulb tapers from above the first aperture to a second portion adjacent a conduit to provide for increase water flow and lower pressure above the conduit, wherein the conduit is in fluid communication with a drain of the housing.

In another aspect the present invention may be said to consist in a washing machine with a bowl adapted to hold water in an interior portion, the washing machine comprising: a housing for coupling to the bowl, the housing having an interior, an impeller disposed in the interior, a motor for driving the impeller, a housing cover comprising a first aperture for fluid communication between the bowl interior and the housing interior and comprising a wall extending from the housing cover and encircling the first aperture to define a volute around the first aperture, and a hood disposed above the wall, the hood comprising a second aperture for venting air bubbles into the bowl interior.

Preferably a bulb in the hood for accommodating air bubbles, wherein the second aperture is in the bulb.

Preferably the bulb is adapted to accommodate lint.

Preferably bulb tapers from above the first aperture to a second portion adjacent a conduit to provide for increase water flow and lower pressure above the conduit, wherein the conduit is in fluid communication with a drain of the housing.

In another aspect the present invention may be said to consist in a washing machine with a variable speed pump for pumping out wastewater, a controller for controlling the speed of the pump and a sensor for determining the flow-rate of water being pumped from the washing machine, wherein the controller controls the speed of the pump to maintain the flow-rate at a desirable level.

In one aspect the present invention may be said to consist in a method of controlling a washing machine with a variable speed pump for pumping out wastewater, the method comprising determining the flow-rate of water being pumped from the washing machine, and controlling the speed of the pump to maintain the flow-rate at a desirable level.

In another aspect the present invention may be said to consist in a washing machine with a variable speed pump and a pump controller, wherein the spray pattern for recirculation of water in the washing machine can be altered by varying the pump speed using the controller.

In another aspect the present invention may be said to consist in a method of controlling a washing machine with a variable speed pump and a pump controller, the method comprising varying the pump speed using a controller to alter the spray pattern during recirculation of water.

In another aspect the present invention may be said to consist in a washing machine with a variable speed pump for recirculating water within a washing machine bowl, a controller for controlling the speed of the pump and introduction of water into the washing machine bowl, and a sensor for determining the current in the pump stator, wherein the controller controls the washing machine to introduce further water into the washing machine bowl when the current level is below a threshold indicating that the pump is ventilating.

In another aspect the present invention may be said to consist in a method of controlling a washing machine with a variable speed pump for recirculating water within a washing machine bowl, the method comprising determining the current in the pump stator, and controlling the washing machine to introduce further water into the washing machine bowl when the current level is below a threshold indicating that the pump is ventilating.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art The term "comprising" as used in this specification means "consisting at least in part of". Related terms such as "comprise" and "comprised" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the invention will be described with reference to the accompanying drawings of which:

FIGS. 2 to 5 show various views of a washing machine bowl of a washing machine, including a pump driven by a brushless DC motor arranged in the bottom of the washing machine bowl.

DETAILED DESCRIPTION

Figure 1:
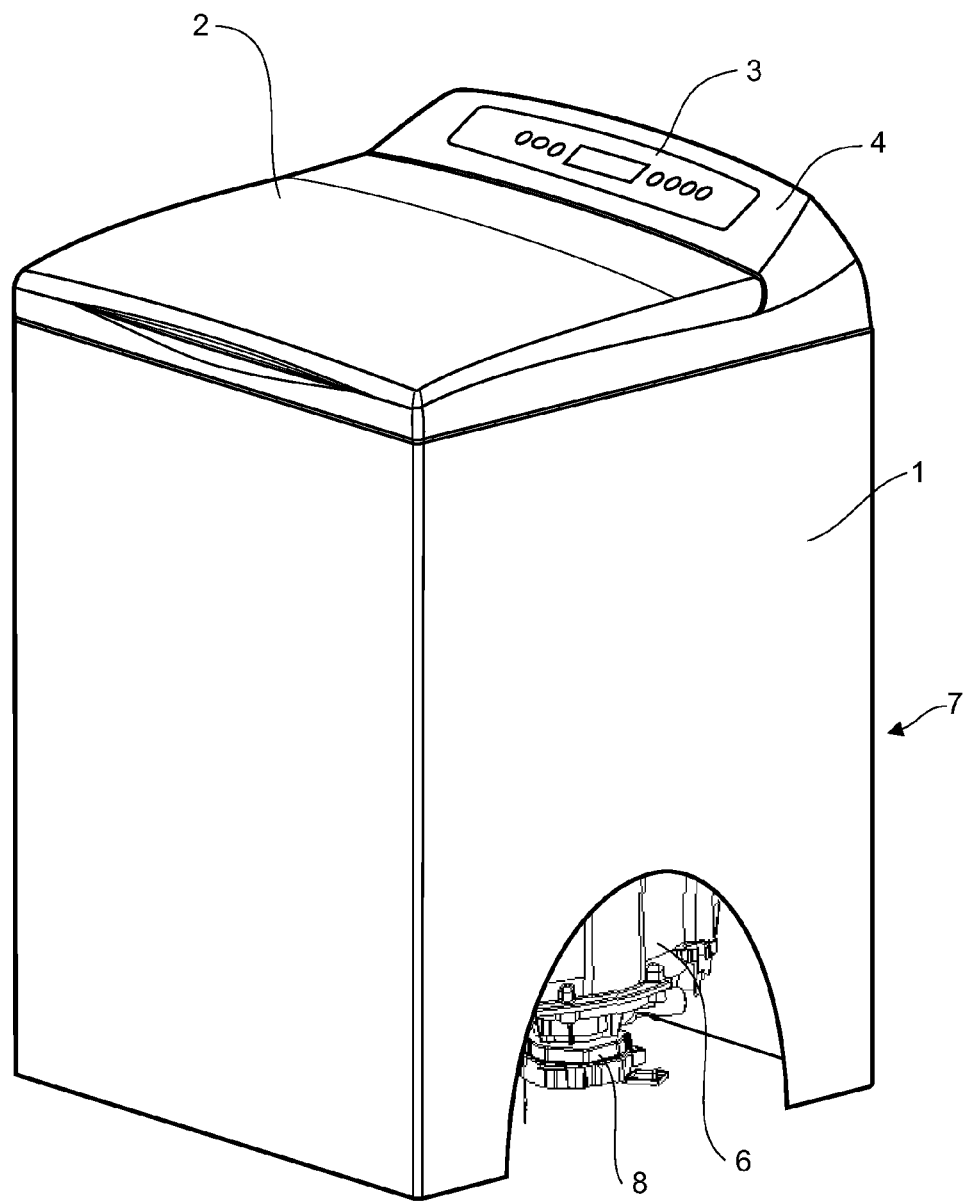
FIG. 1 shows a washing machine with a portion cutaway to show part of a washing machine bowl and pump.
Figure 2:
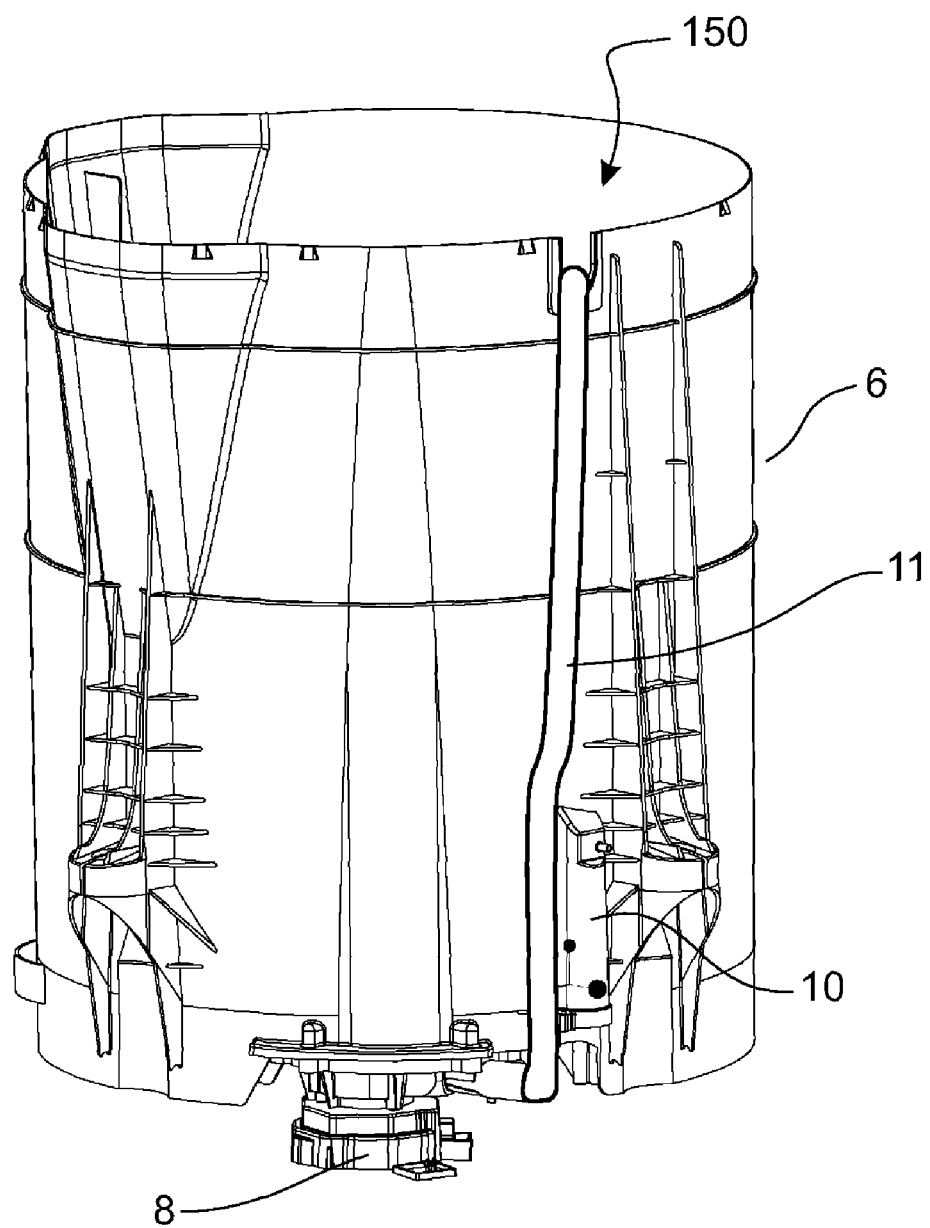
Figure 3B:
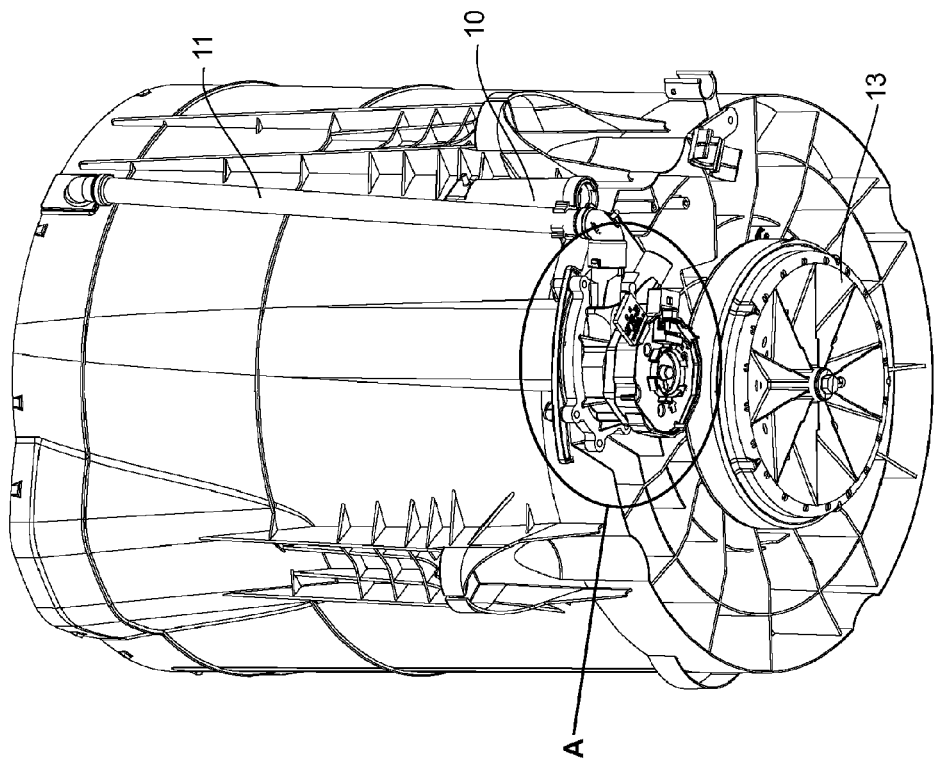
Figure 3A:
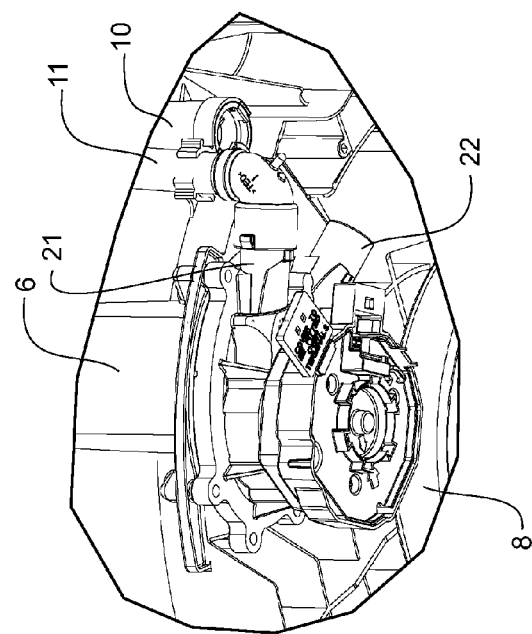
Figure 5:
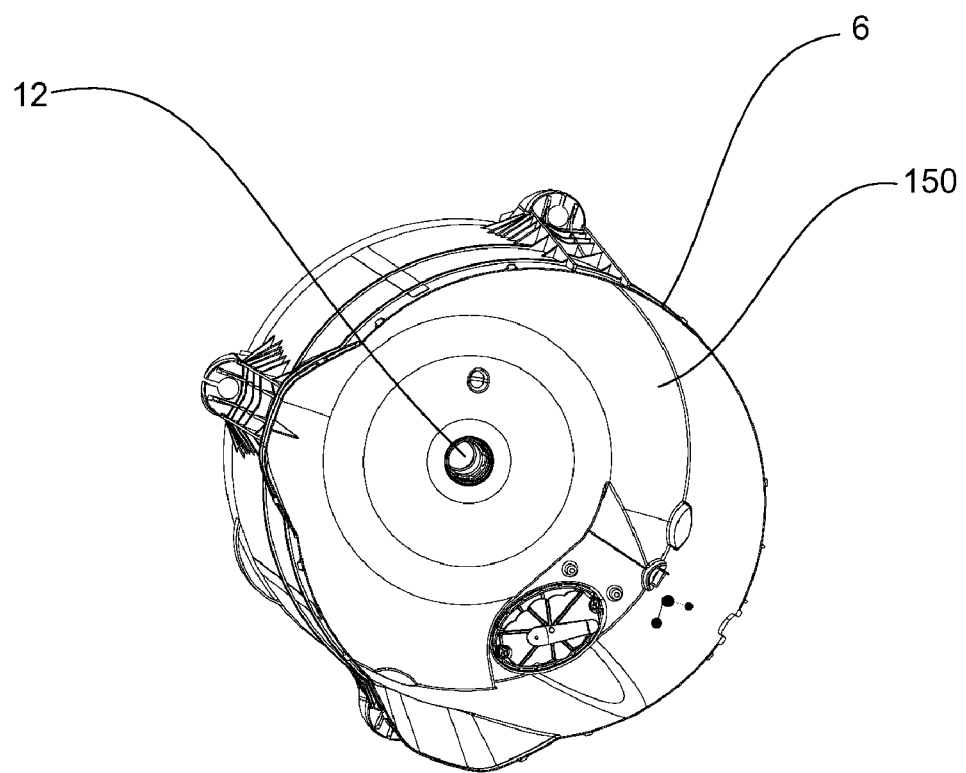
Figure 15:
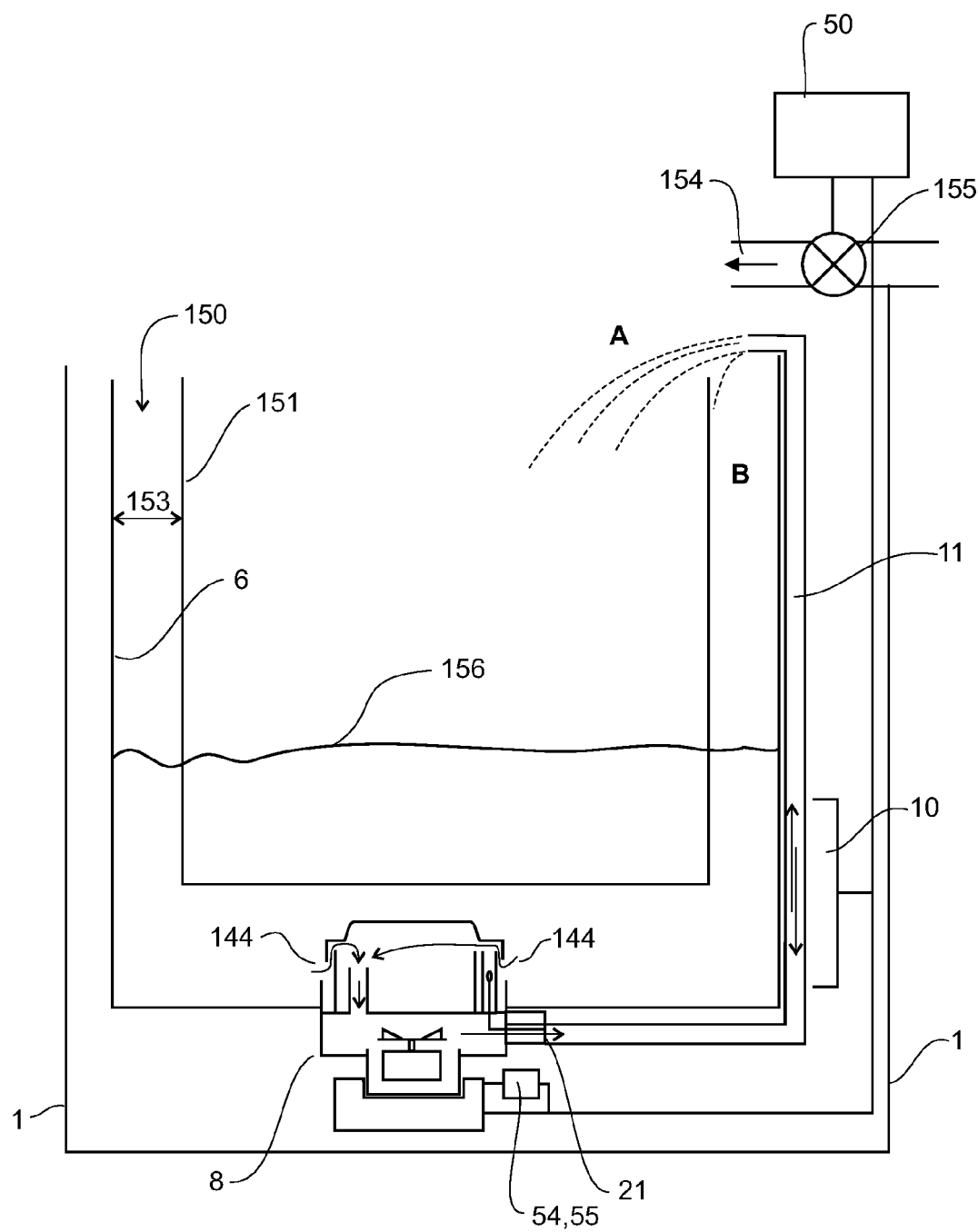
FIG. 15 shows a cross-sectioned schematic diagram of the washing machine with the pump shown and various water flow paths.

FIG. 1 shows a washing machine 7 in accordance with the invention, including a pump 8 that can be operated in various manners in order to improve the operation of the washing machine. The washing machine comprises an outer wrapper 1, a lid 2 and a control panel 3 on a front face 4. The control panel is connected to washing machine control electronics, comprising a controller 50 to be described in relation to FIG. 7, and other electronics for control of the washing machine. It will be appreciated that the washing machine comprises a number of other components that are not shown which are typical to a washing machine of this type and will be known to those skilled in the art. As shown in the cutaway portion the washing machine also contains a washing machine bowl or tub 6 within the outer wrapper 1. The washing machine bowl has an interior 150 (shown in FIGS. 5, 15) for holding wash water, and also for retaining a spin basket 151 (shown schematically in FIG. 15). Referring to FIG. 15 the spin basket is nested in the bowl 6 with a tolerance such that the spin basket can rotate and/or move within the bowl 6. A gap 153 preferably exists between the outer wall of the spin basket and inner wall of the bowl 6. The spin basket holds a wash load and is manipulated within the wash bowl 6 in order to clean the items in the wash load in a manner known to those skilled in the art.

The washing machine pump 8 is provided to allow for recirculation of water in the wash bowl and draining of water from the wash bowl. Referring to FIG. 15, which shows aspects of the washing machine in schematic form, the washing machine also comprises a water inlet 154 and control valve 155 that is adapted to be connected to a water supply. The control valve is operated by the controller 50 during various stages of operation of the machine 7 to introduce water into the bowl 6 for washing the wash load in the spin basket. Details of this will be known to those skilled in the art. Note that FIG. 15 omits details of the motor for operating the spin basket 151.

The present invention relates to various features and operations of the pump in relation to the washing machine to improve one or more aspects of the washing machine operation. The washing machine pump 8 and its relationship to the washing machine bowl will be described in more detail with respect to FIGS. 2 to 5.

The washing machine bowl 6 according to one embodiment of the invention is shown in FIGS. 2 to 5. The washing machine bowl 6 can be assembled into a washing machine housing cabinet or wrapper 1 as shown in FIGS. 1 and 15 in the usual manner and with the usual control mechanism to provide a washing machine appliance. The washing machine bowl 6 is preferably moulded from a suitable plastics material as known by those skilled in the art. The bowl comprises a generally cylindrical shape with external wall profiling. It also comprises an aperture 12 for mounting (see FIG. 5) a rotor 13 of an electric motor (only the rotor 13 is shown) for controlling the movement of the bowl 6 and spin basket 151 therein during agitate and spin cycles. The motor can be any suitable know to those skilled in the art. The washing machine bowl 6 has the washing machine pump 8 attached to the bottom of the bowl 6. The pump is a variable speed pump 8 assembly operated by a brushless DC motor (hidden in the pump housing 20 but partially shown in FIG. 6). This provides a pump mechanism for carrying out various operations during the machine's washing cycle. In brief, the brushless DC motor pump 8 comprises a housing 20 that is moulded into the outer bowl 6, or bolted or otherwise fixed to the bottom of the washing machine bowl 6 (such as described in co-pending application NZ 543427 also filed today, 4 Nov. 2005, by the same applicant). The interior of the housing 20 is in fluid communication with the interior of the bowl 6 which allows for pumping of water into and out of the interior of the bowl for example as shown by the arrows in FIG. 15. The housing 20 comprises a recess cup 23 (visible in FIG. 6) for a rotor and a pump actuator, such as an impeller. A stator portion of the motor is assembled outside of the wash bowl 1 around the exterior of the recess for the rotor. These features are not all visible in FIGS. 2 to 5 but will be described in relation to FIG. 6. Referring to FIG. 3a, the pump comprises an outlet or port 22 for connection to a drain (not shown) for draining water from the interior of the bowl 6 upon rotation of the impeller in a first direction. It also comprises another outlet or port 21 connected to a conduit 11 that extends up the height of the bowl 6 and has an exit aperture which spills contents into the bowl 6. This arrangement provides for recirculation of water, upon rotation of the impeller in a second direction, in the bowl 6 using the pump 8 though the recirculation conduit 11 and back into the bowl 6. As will be know to those skilled in the art, during a wash cycle, wash water in the bowl 6 is pumped from the bottom of the bowl 6 and sprayed back in to ensure sufficient movement of water through the wash load. FIG. 15 shows the recirculation flows through the outlet 21.

Figure 7:
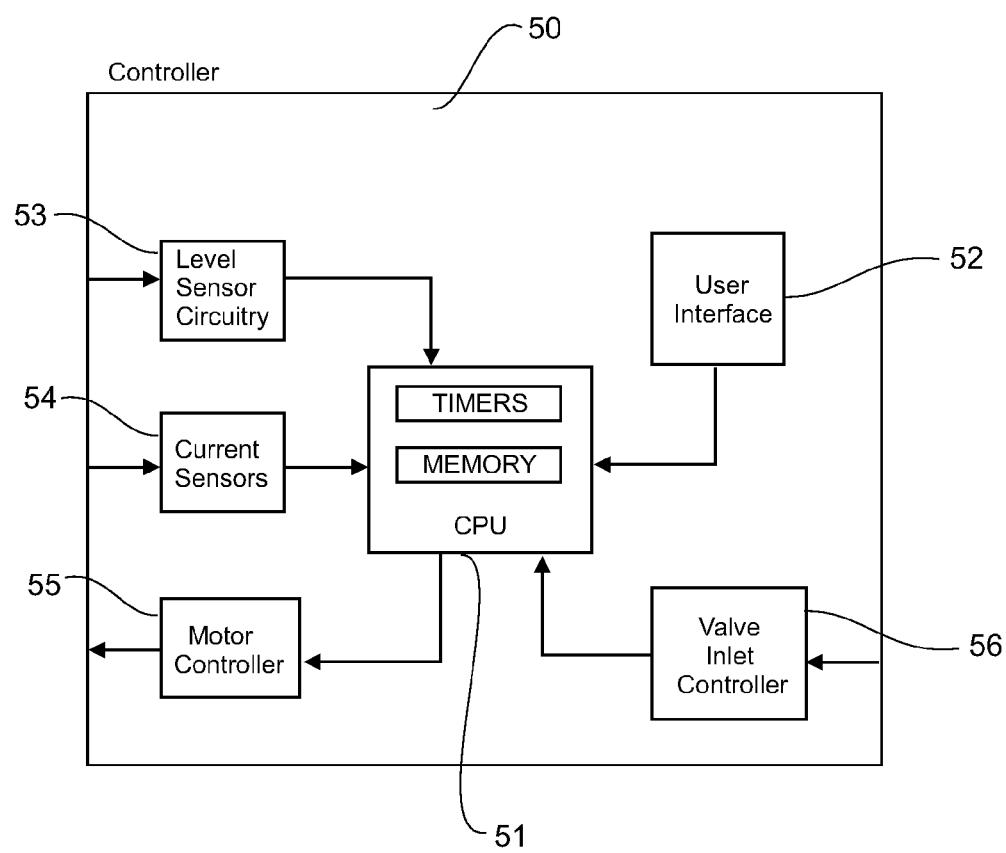
FIG. 7 shows a controller used in the washing machine to control operation of the pump.

Referring to FIGS. 2 to 5, a water level sensor 10 is provided for the washing machine bowl 6 to determine the water level in the bowl at any particular time. The water level sensor 10 is preferably a pressure sensor connected to the controller 50 as shown in FIG. 7. An example of a water level 156 is shown in FIG. 15. The pressure sensor provides output parameters in the form of data and/or signals that are directly or indirectly indicative of water pressure in the bowl 6 and/or can be used to determine water pressure in the bowl 6. The pressure sensor 10 and controller 50 can be operated to determine the level of water in the washing machine bowl 6 at any instant by measuring the pressure of water in the bowl via the pressure sensing in the sensor tube 10. The pressure sensor can take measurements of pressure continuously or periodically to obtain the water pressure parameters for use in determining water levels. Preferably the pressure sensor 10 is a solid state silicon pressure sensor Motorola MPXD4006. This sensor outputs a voltage proportional to water level based on the water pressure. Alternative sensors could be used such as one that detects a change in inductance with water level and is driven by a resonant circuit where the resonant frequency is measured to determine water level. Other possible sensors could have switch outputs for various quantized water levels. Any suitable sensor could be provided that provide output parameters that directly or indirectly provide or can be sued to determine an indication of water level in the bowl 6.

Figure 6A:
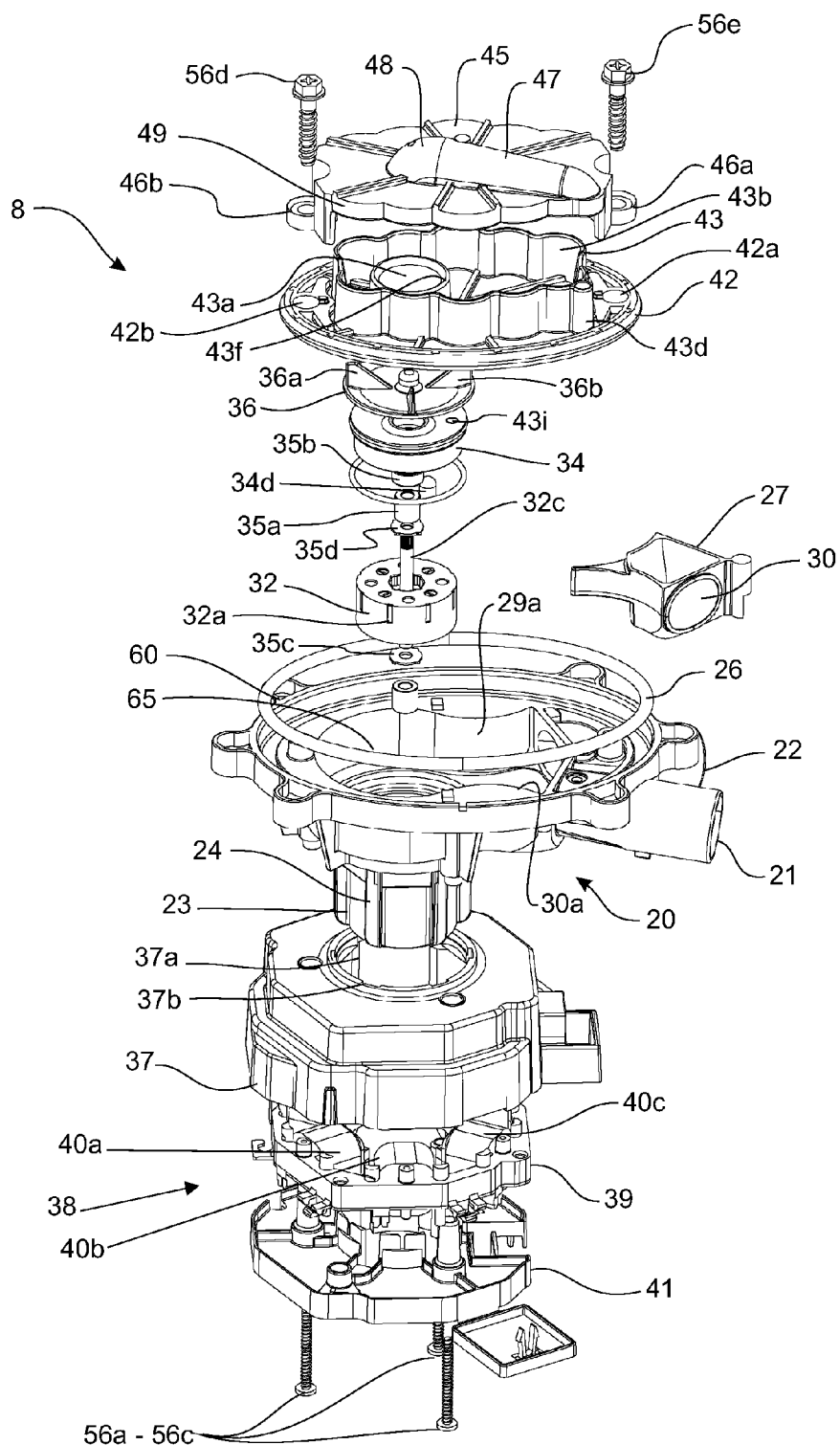
FIGS. 6a and 6b show an exploded perspective view and a cross-section view of the brushless DC motor pump.
Figure 6B:
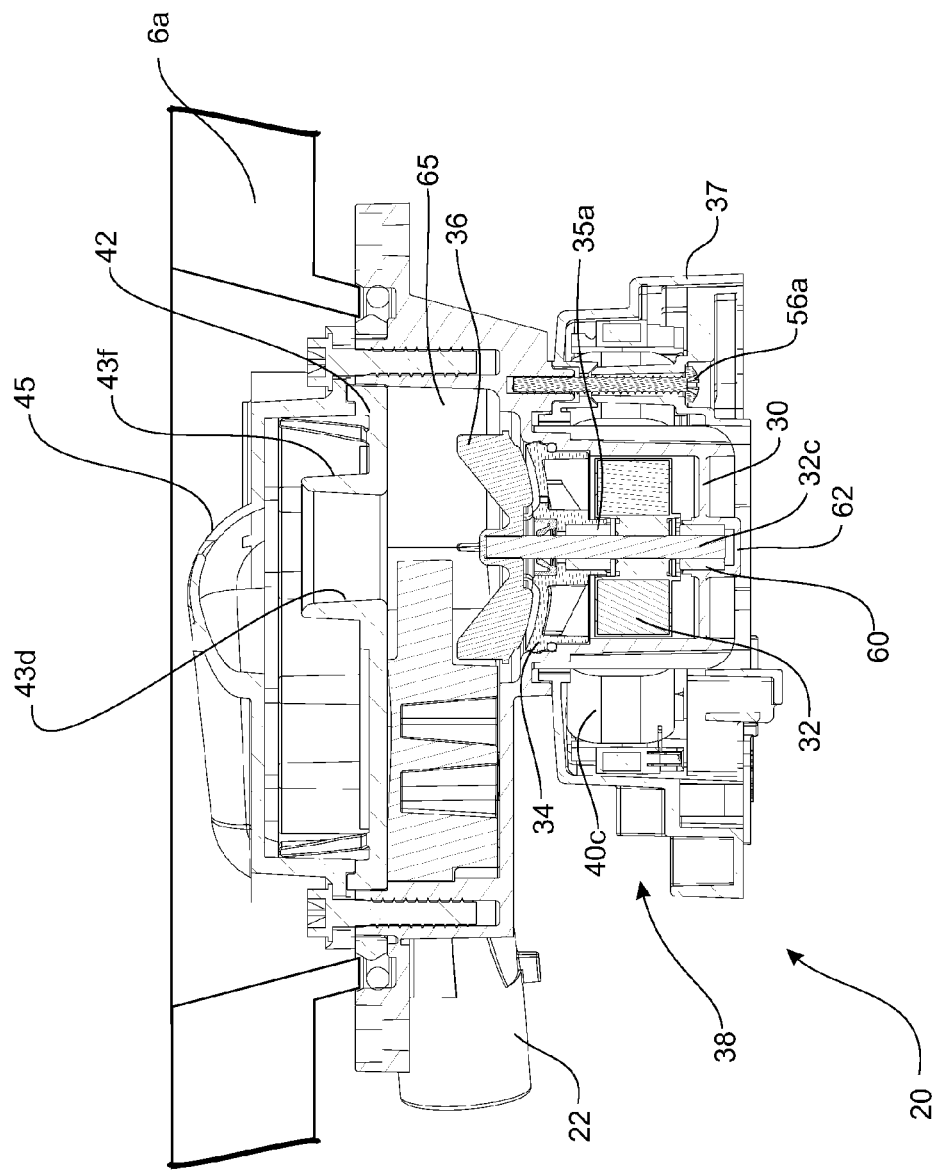

FIGS. 6a, 6b show the brushless DC motor pump 8 in more detail. The assembly comprises a pump housing 20 moulded from plastics. The pump housing comprises recirculation and drain outlets 21, 22 for connection to drain (not shown) and the recirculation conduit is (shown in FIGS.—2-5, 15) in the washing machine 7. The housing 20 also comprises a rotor cup, recess or cavity 23 which comprises interlocking portions 24 moulded into the external surface. On the rim of the top portion of the housing 20 are lugs 25 for receiving bolts for attaching the housing 20 and other lower sub-assembly components to the bottom of the washing machine bowl 6. A seal 26 is placed on the inside of the rim on the upper portion of the housing 20. The housing has a main chamber 65 in the interior. A flapper valve 27 is assembled on an inside portion of the housing 20 to close off the drain and recirculation outlets 22, 21 as required. The flapper valve 27 comprises an engagement portion or hinge 28 that interlocks with a respective recess (hidden by seal 26) in the housing 20 between the recirculation 21 and drain 22 outlets, for locating the valve in the housing 20. Each side 29, 30 of the flapper valve 27 is profiled to abut against the opening of the drain 22 and recirculation 21 outlets respectively. A flap of the valve 28a is adapted to abut against a profiled surface adjacent 29a, 30a to the respective outlets. The flapper valve 27 can rotate along the axis of the interlocking engagement portion or hinge 28 and can abut against either the recirculation 21 or drain 22 outlet openings to form a seal as required. When the pump operates in one rotational direction, the water dynamics coerce the flapper valve 27 to seat against the recirculation outlet 21 and close it off, putting the machine into a drain cycle. When the pump operates in another rotational direction, the water dynamics coerce the flapper valve 27 to seat against the drain outlet 22 and close it off, putting the machine into a recirculation cycle.

Figure 13A:
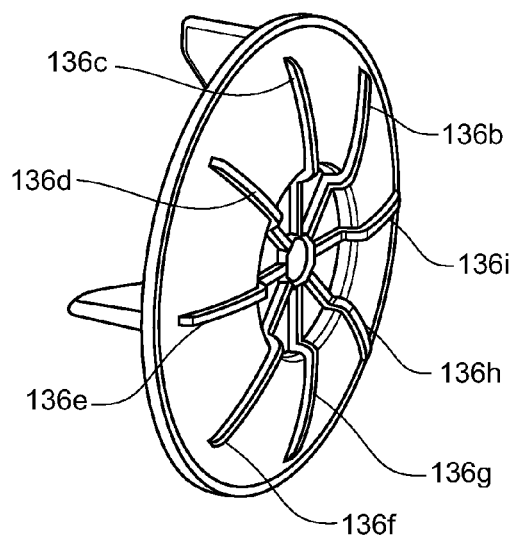
FIGS. 13a to 13c show the impeller of the pump in further detail.
Figure 13B:
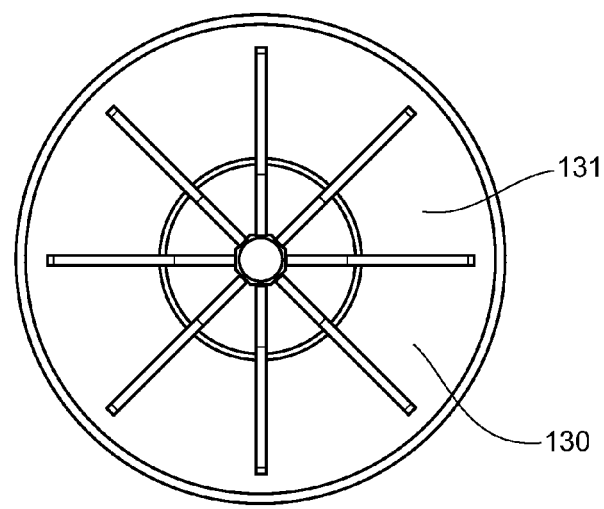
Figure 13C:
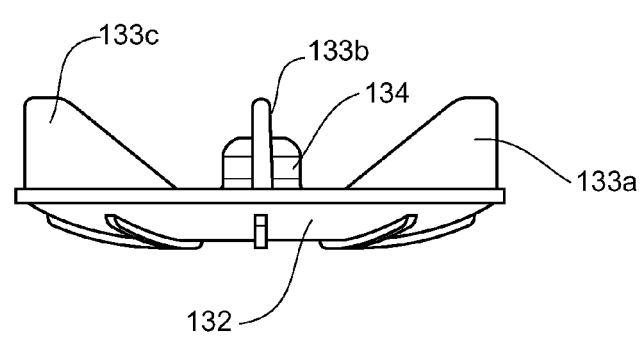

A rotor 32 which forms part of the brushless DC motor of the pump is provided. The rotor is made of plastics material with magnetic inserts e.g. 32a and has an axle 32c located in the cup 23 of the housing 20. In preferred embodiment there are four magnetic inserts to form four rotor poles. The axle sits in a cylindrical bearing insert 60 disposed in the bottom of the cup 23 abutting the axial bearing 35c allowing the rotor 32 to rotate therein. A seal 33 and rotor cap 34 is assembled over the axle 32c along with a washer 60a and graphite bearing 35a to encapsulate the rotor 32 in the cup 23. A seal insert 35b inserted in the aperture 34b in the cap 34 sits around the rotor 32 axle to provide a seal. Another axial bearing 35d is provided. An aperture 34c containing filter 34d is also formed through the rotor cap 34. Attached to the top of the rotor axle is an impeller 36 formed from plastics material. The impeller 36 comprises preferably four vanes (e.g. 36a, 36b) that pump water when the rotor 32 is rotating in either direction. The underside of the impeller also comprises further vanes for dislodging particulate matter. The impeller will be described in further detail with respect to FIGS. 13a-13c.

Referring now to the bottom portion of the pump 8, the motor of the pump will be described. A stator housing 37 is assembled over the pump housing cup 23. The stator housing 37 comprises an aperture 37a with recesses e.g. 37b disposed about the circumference that interlock with the moulded interlocking portions e.g. 24 on the exterior of the housing cup 23. This retains the stator housing 37 in place such that it is prevented from rotating. The stator housing 37 has a generally hexagonal exterior and interior although has a shaped exterior moulded to fit the shape of the stator windings and other components assembled in the housing 20. A stator 38 is inserted inside the stator housing 37 and is retained in place by screws 56a to 56c or other affixing means. The stator 38 is formed from a generally hexagonal frame 39 and a number of stators (e.g. 40a, 40b, 40c—the other stators are hidden) that protrude radially inwards from the frame 39. The stators 40a-40c are formed from stator windings in the usual manner. In one possible embodiment, there are 6 stators. Each stator e.g. 40a-40c is formed from a coiled winding and the stators are arranged to abut closely to the exterior of the cup 23 and arranged within the exterior interlocking mouldings 24. The stators e.g. 40a-40c are wired with three separate phases to provide stepped motor control. A housing base cap 41 is placed over the stator 38. The base cap 41 is held or retained in place with screws 56a-56c or other affixing means. A brushless DC motor implements electronic commutation. The pump comprises all the necessary electronics and software to implement the electronic commutation, including hall effect sensors and/or back emf sensors as required. Details of the commutation of brushless DC motors and how this is implemented will be known to those skilled in the art and need not be described here.

Referring now to the top portion of the pump assembly in FIG. 6, a pump or housing cap 42 is affixed over the top opening of the housing 20 from the inside of the washing bowl 6. The outer perimeter of the cap 42 comprises a co-moulded seal and openings 42a, 42b for bolts 56d, 56e to affix the cap to the housing 20. The top of the cap 42 comprises a flower shaped wall 43 that forms a volute 43b on the top of the cap 42. In the volute has an opening 43a that is coaxial with the axis of the rotor 23 and entire pump assembly and sits over an aperture in the bottom of the washing bowl 6 (not shown). The opening 43a includes a cylindrical wall 43f that extends some way up the height of the volute. Over the top of the volute is a hood 45 which has a flower shaped exterior corresponding to that of the volute wall 43. The flower shaped exterior lip 49 extends down below the top of the corresponding cap, the flower shaped wall forming the first inlet weir. The hood 45 comprises two lugs 46a, 46b which correspond to openings 42a, 42b in the pump cap 42. The volute hood 45 includes a profiled bulb 47 in the top surface. An aperture 48 in the top of the profiled bulb 47 is also provided which encourages the release of air bubbles during, particularly, ventilation. The aperture 48 is of a suitable size to vent bubbles, such as between 2.5 mm to 3.5 mm in diameter. Additionally this aperture is flushed by the water in the drain/recirculation conduit anytime the pump direction changes. A leak flow recirculation tube 43d or conduit is also in the pump cap 42, which forms a fluid communication channel between the pump housing 20 and the exterior of the pump 8. The bulb is positioned in the hood 45 such that when the hood is fitted above the volute wall 43 the bulb extends from the aperture 43a to the interior of the pump to the top of the leak flow tube 43d outlet. Preferably, the bulb is rounded at both ends and has a diameter and the aperture 43a end that is commensurate with the diameter of the aperture 43a. This means the diameters are of a similar size, although not necessarily exactly the same. Similarly the diameter of the bulb at the leak flow tube 43d end is commensurate with the diameter of the leak flow tube 43d. Preferably, therefore, the width of the bulb tapers from the aperture 43a end to the leak flow tube 43d end. This arrangement and configuration of the bulb 47 coerces water that exits the aperture 43a into the bulb portion and then directs it towards and over the end of the leak flow tube 43d. The tapering increases the speed of this water flow as it tends towards the top of the leak flow tube, thus lowering the water pressure above the leak flow tube.

The pump 8 is installed in or integrated with the bowl as shown in FIGS. 2 to 5, 6b and 15 as described, for example, in NZ 543427. Referring to FIG. 6b, the lower housing subassembly 20 is installed on the underside of the bowl bottom 6a, and extends below the bowl bottom 6a. The upper subassembly, including the cap 42 and hood 45 are positioned in the interior of the bowl 6 above the bowl bottom 6a. The cap 42 is attached to the lower assembly to define a housing interior. This interior comprises the main chamber 65 that comprises among other things the impeller, and also the cavity for the rotor. The cap 42 and hood 45 are in fluid communication with the interior of the bowl 6 and the cap and hood are in fluid communication with at least a portion of the housing interior e.g. 65 such that at least a portion of the housing interior is in fluid communication with the bowl 6. Water enters the main chamber from the bowl 6 as shown by the arrow 144 in FIG. 15. It can be pumped through the recirculation output 21 and drain outlet 22 (hidden behind the drain outlet 22 in FIG. 15) as required by the impeller. When the impeller rotates in a clockwise manner when viewing the pump from above, water that flows from the bowl 6 into the main chamber will be transferred to the drain outlet 21 under rotation of the impeller. When the impeller rotates in a counter-clockwise manner, water that flows from the bowl into the main chamber will be transferred to the recirculation outlet 21 under rotation of the impeller and through the recirculation conduit 11 as shown in FIG. 15.

Referring to FIG. 7, a controller 50 is provided to control operation of the pump 6 and other aspects of the machine operation. The controller forms part of the overall electronics implemented in the machine to control operation. The general nature of such electronics will be known to those skilled in the art. The CPU could be any suitable microcontroller, microprocessor or other controller device known to those skilled in the art. The memory could be internal or external to the CPU, and could be of any suitable type. There might be several different types of memory, all implemented in physically separate portions of the controller. The controller 50 also comprises water level sensor circuitry that receives parameters in the form of signals or data from the water level sensor 10, be it a pressure sensor or other sensor type as described previously. The level sensor circuitry can receive the signals or data and from this determine water pressure and/or water level, or process the data or signals for passing on to the memory and CPU 51, which can carry out the processing to determine or calculate water levels and flow-rate. For example, this can be the flow-rate from water in the bowl 6 out through the drain and/or recirculation outlets. By calculating the change in water level in the bowl (through water pressure or otherwise) the CPU can determine the flow of water from the bowl and from this infer the flow-rate of water into the drain outlet 22, and/or recirculation outlet 21.

The current sensors 54 are coupled to the motor of the pump 8 in order to determine the current drawn or other parameters indicating current from the pump and from this pass signals or data onto the CPU so the pump speed can be determined from the sensed current. Optionally, other sensors that sense other motor parameters could be used to determine pump speed. The controller also comprises a pump motor controller 55. The CPU 51 is coupled to this for controlling operation of the pump, such as pump speed, and starting and stopping the pumping operation. The CPU and memory 51 are also connected to the user interface 3 for allowing operation in response to user input, and to provide output to the user. A valve inlet controller is provided for controlling the flow of water into the bowl 6 from the water supply. Details of this will be known to those skilled in the art.

It will be appreciated that FIG. 7 shows the logical configuration of the various components. The actual physical configuration could be provided in the number of forms. For example, a number of the components shown could be operated in a microcontroller, microprocessor or the like, or there could be a separate microcontroller and separate circuitry. Those skilled in the art will appreciate that there are a range of ways to implement the functionality.

The brushless DC motor pump 8 can be operated in a number of ways to provide various functionality in the washing machine cycle as will now be described.

The CPU and memory 51 in the controller implement an adaptive algorithm to maintain and adjust pump-out rates for various drain head height installations during the drain cycle. The drain head height varies depending on the location of the machine. For example, in some countries it is common for the washing machine to be placed in a basement. Therefore the drain pipe has to extend vertically to empty into a drain usually above the washing machine at street level. This therefore requires a higher pump speed to ensure sufficient water pressure to reach the required height at the desired flow-rate. In other countries it is common to have the washing machine at floor level which can drain through the usual drain outlets provided at floor level. Therefore the water pressure to keep the desired pump-out rate (flow-rate) for the drain is less as the drain water does not have to be pumped upwards first.

Figure 8:
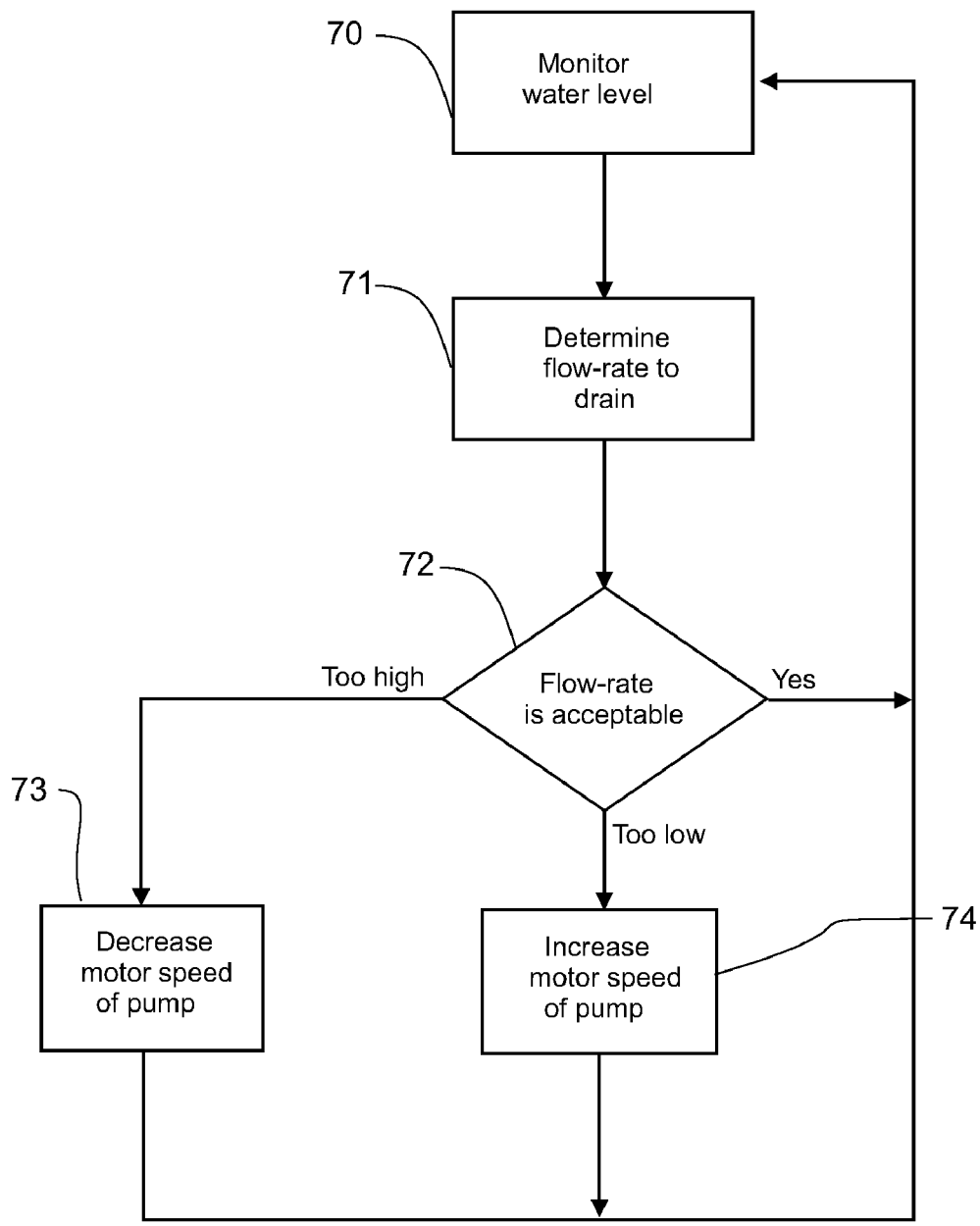
FIGS. 8 and 9 show flow diagrams setting out methods of adjusting the pump speed to maintain a constant drain flow-rate.

Therefore, in one embodiment of the invention the pump 8 speed (rpm) is altered as required to keep the drain pump-out rate constant or substantially constant, irrespective of the required height to which the drain water needs to be pumped. The method is shown generally in FIG. 8. To do so, the CPU 51 receives information from the water level sensor circuitry 53 to determine the level of water, step 70, 71, at any particular time. The water level sensor circuitry 53 is connected to the water level sensor 10 in the bowl 6, which together determine the water level from the pressure. By monitoring the change in water level through the level sensor 10 the CPU 51 can calculate the flow-rate of drain water out of the washing machine bowl 6. If the drain flow-rate drops below a desirable level, step 72, for example due to a high head height for the drain pipe, then the CPU 51 can increase the pump speed, step 74, by way of the motor controller 55. Alternatively, if the pump out rate is greater than the required level, then the CPU 51 can slow down the pump, step 73, by way of the motor controller 55. Preferably the drain of the flow rate is in the order of 17 to 20 litres per minute, although it will be appreciated by those skilled in the art that this will alter in various circumstances. At a 4 foot head height, this translates into a pump speed of approximately 2400 rpm. At 6 foot and 8 foot this translates into pump speeds of approximately 2900 rpm and 3300 rpm respectively.

It will be appreciated that these figures are indicative only and actual values will depend on head height and pump characteristics. The benefit of altering the flow-rate is that the speed of the pump can be reduced to the minimum speed required, thus reducing unnecessary noise, and energy consumption. It will be appreciated that the flow rate could be kept to with any suitable preferred flow-rate range, or alternatively a specific flow-rate. In this specification, the term "preferred flow-rate" relates to either a specific flow-rate, or a preferred flow-rate range which encompasses some tolerance. The preferred flow-rate is defined by data stored in memory 51.

Figure 9:
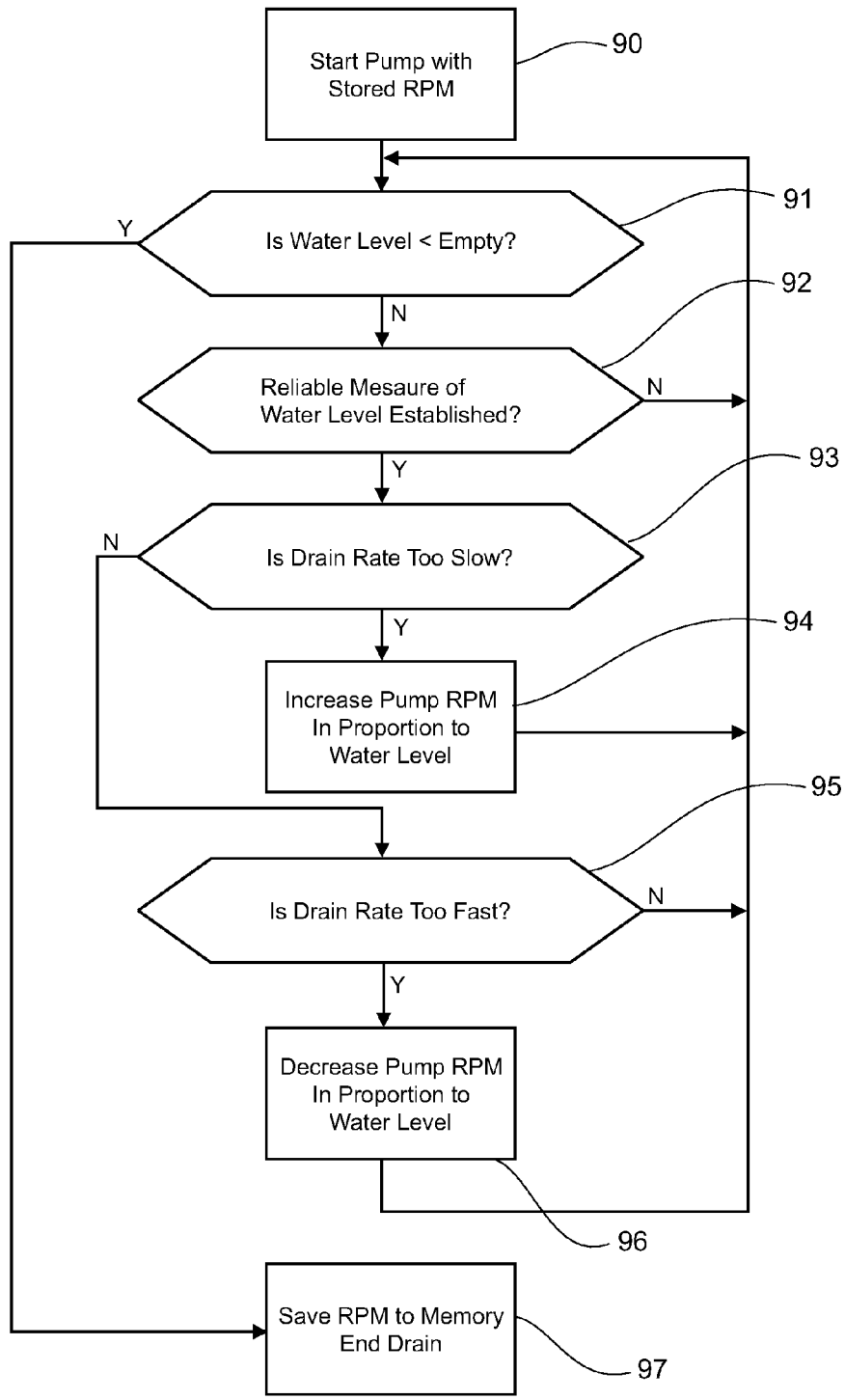

A more detailed description of the method will now be described with the reference to FIG. 9. During operation the controller controls the pump by starting it at a speed as stored in memory, step 90. This will be a nominal starting rpm for the motor and pump 8 that has been predetermined as suitable. This value can be defined by data stored in the memory 51 or another suitable part of the controller 50. This could, for example be, an $E^2$ PROM. Throughout the process, the controller 50 monitors the water level using readings from the water pressure sensor which sensors parameters as described previously. If the water level is below a threshold such that it is considered that the bowl is empty, step 91, the controller saves the current pump RPM to the memory 51 and then controls the motor via the motor controller 55 to stop the pump and end the drain cycle, step 97. The threshold is defined by data stored in memory 51 or other memory in the controller 50. This water level might, for example, be 50 mm of water in the bottom of the bowl, although it will be appreciated that a suitable level might be different depending on the characteristics of the washing machine 7. If the water level is not yet below the empty threshold, the controller then determines whether a reliable measure of the water level change, which correlates to drain flow-rate, has been established, step 92. For example, the measure might be determined as reliable if a minimum number of samples or counts of the water level have been taken within a predetermined time. An example of this is if three water levels have been taken, and this has occurred within 20 seconds. If a suitable number of readings have not be taken in the period determined, the operation times out and the measure is considered unreliable. If a reliable measure is not obtained, the controller continues to monitor the change in water level until it obtains a reliable measure of the water level change and therefore flow-rate, step 91. If a reliable flow-rate measure has been obtained, the controller 50 then determines whether the drain-rate is too slow, step 93. As described previously, it does this by comparing the flow-rate determined with the preferred flow-rate stored in memory. Preferably, the preferred flow-rate is define by data stored in the memory 51 or other suitable memory, and this can be predetermined and set during manufacture of the machine, or configured by a technician at a later stage. Also as mentioned previously, the preferred flow-rate could be a range of flow rates, such as preferably 15-25 litres per minute, or more preferably 17-20 litres per minute, or a more specific flow-rate if a tolerance range is not required.

If the drain flow-rate is too slow, step 93, then the CPU 51 operates the motor controller 55 to increase the pump speed. It increases the pump speed in proportion to the flow-rate, step 94. If the drain flow-rate is not too slow, then the CPU 51 determines if the drain rate is too fast, step 95, by comparing it to the preferred drain flow-rate. If the drain flow-rate is not too slow, then the CPU 51 goes back to monitoring the water level using the sensor. If the drain flow-rate is too fast then the CPU 51 controls the motor controller 55 to control the speed of the pump. This is altered in proportion to the water level change, step 96. After this the CPU 51 continues monitoring the water level.

As noted above, the speed of the pump is altered proportionally to the detected water level change. For example, if the detected flow-rate is a specified percentage (e.g. 10%) less than the preferred flow-rate, then the pump speed could be increased by that percentage (e.g. 10%). This is an iterative approach whereby the flow-rate is re-calculated, the percentage difference from the preferred flow-rate determined and the speed of the pump is altered again by the re-determined percentage. This iterative process continues.

Figure 16:
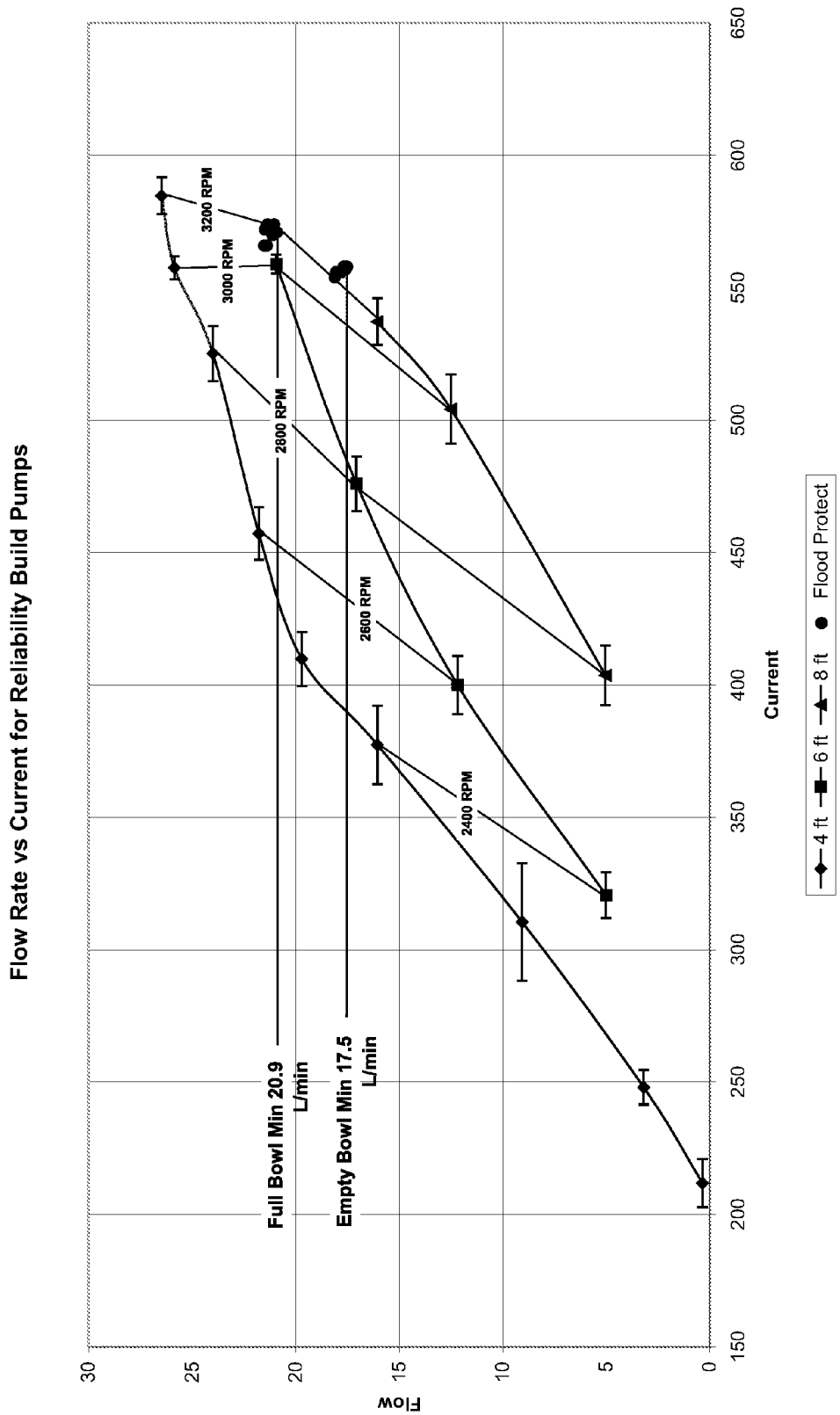
FIG. 16 shows a graph of flow-rate (litres/minute) vs current (mA) for the pump for various pump speeds (rpm) and head heights.
Figure 17:
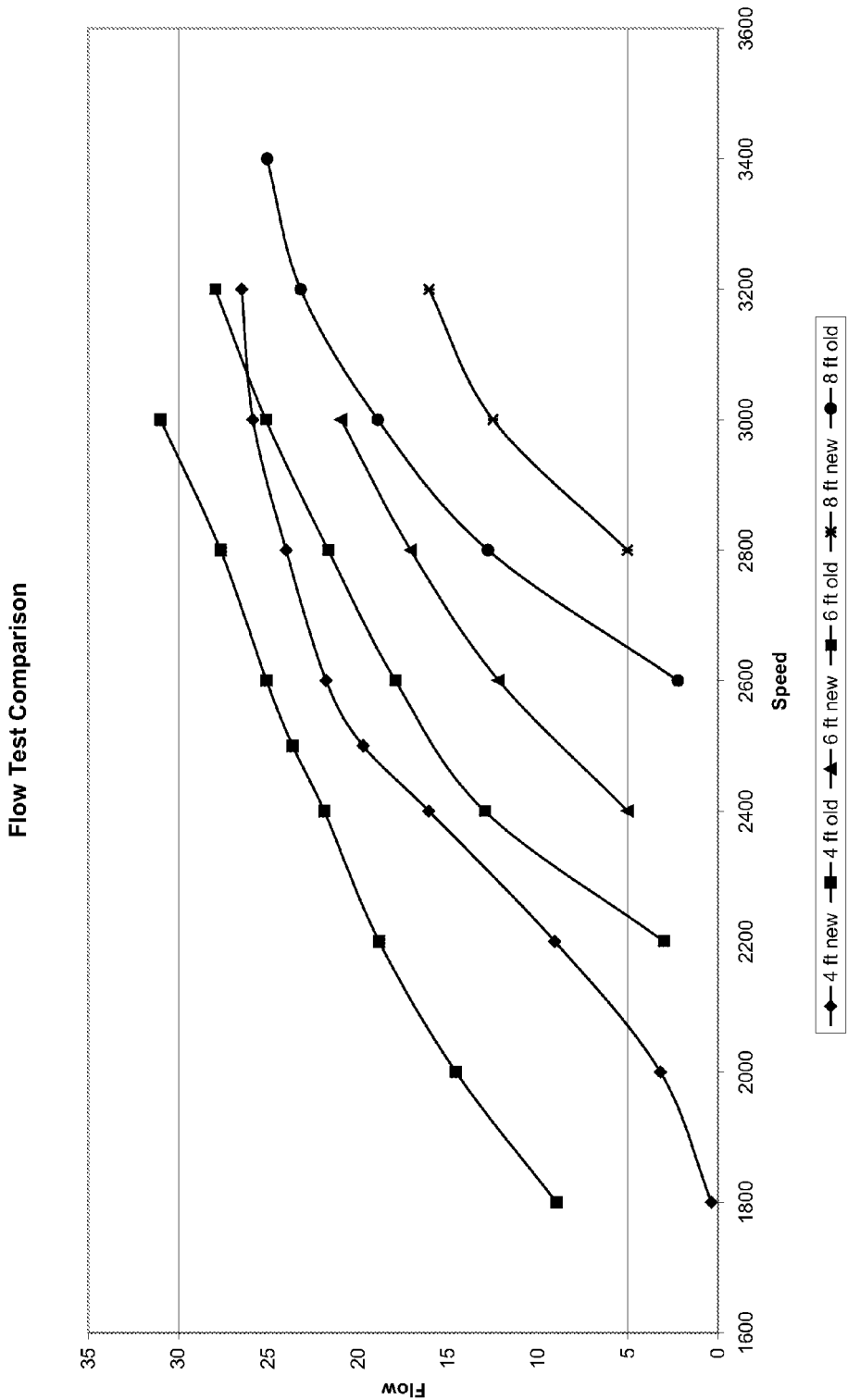
FIG. 17 shows a graph of flow-rate vs speed for various head heights.

Alternatively, the current drawn by the motor of the current can be used to determine water level, instead of using the water level sensor. A higher water level requires less pump work or speed in order to maintain a particular flow-rate. This in turn requires the motor of the pump to draw less current. FIGS. 16 and 17 show a graph of possible flow-rates vs current drawn by the pump motor for various motor speeds (rpm). From this relationship, by measuring the pump current, the flow rate can be inferred, and then the pump speed altered accordingly to maintain the desired flow-rate, as described in relation to FIGS. 8 and 9.

As noted in FIGS. 16 and 17, the flow rate vs. current relationships are stated for different pump speeds. The pump speed can be determined in any suitable manner. In one possibility the flow-rate is determined from commutation rate of the brushless DC motor. As known to those skilled in the art, a brushless DC motor has electronic commutation. The software and/or electronics that operate the commutation of the excitation applied to the coils. By using hall sensors or sensing back emf in the unenergised coils, the position of the rotor can be determined, and from this the rate of commutation and/or the speed of the rotor determined. This correlates to the speed of the pump. From this, the relationship between speed, flow-rate and current (such as that shown in FIGS. 16 and 17) is used to determine the flow-rate.

Note that FIGS. 16 and 17 show an exemplary relationship determined experimentally from a pump. The relationship between pump speed, motor current and flow-rate will alter for pumps with different characteristics. Relationships for other pumps could be determined experimentally and the results used as described above.

The adaptive algorithm to maintain and adjust pump-out rate can also be used to overcome partial blockages that may be present in the drain outlet. Any partial blockages that slow the flow-rate out the drain outlet will be detected as a slower flow-rate by the CPU 51 via the level sensor 10. The CPU 51 will use the motor controller 53 to alter the pump speed so that the flow-rate reaches the desired level. The process as described above will provide compensation for partial blockages when implemented. That is, the method will alleviate the drawback of differing head heights as well as partial blockages. The method does not necessarily identify what is causing the change in flow-rate (be it the head height or a blockage), but rather detect the flow-rate change and alter the pump speed accordingly.

In another possible embodiment the CPU detects when too much foam has been produced in the recirculation cycle. Upon detecting this, the CPU 51 controls the pump by way of the motor controller 55 to slow the speed of the recirculation water. When foaming has reduced, the CPU can control the pump to increase pump speed again as required. In another possible embodiment of the invention, the CPU 51 can control the motor to vary the pump speed to alter the spray pattern in the washing bowl 6. Referring to FIG. 15, this shows a cross-section of the washing machine bowl 6 and the spin basket 151. The pump 8 recirculates water from the bowl through the recirculation tube 11 and back into the interior 150 of the bowl 6 to recirculate wash water. In a first mode the pump operates at a standard speed which sprays the recirculation water back into the bowl as shown by the dotted line representing water spray indicated at point A. In an alternative mode, the pump speed can be lowered to such that the recirculation water does not have sufficient momentum to reach the inner bowl but rather dribbles out the outlet of the recirculation conduit 10 and trickles down the outside of the spin basket as shown by the dotted line representing water trickle at point B. This cleans lint and other debris off the side of the outer wall of the spin basket. The water still trickles within the inner wall of the bowl 6 in the gap 153 between the inner wall of the bowl and the outer wall of the spin basket. This lint flushing preferably occurs after every spin cycle.

The controller 50 can operate the motor via the motor controller 55 to operate the pump in this manner. The controller can switch to the trickle mode at any suitable point, such as after or during a agitate and/or drain cycle. This will be determined by preconfigured programming of the CPU 51 and the controller 50. In one possible embodiment, the speed of the pump for normal recirculation is 2,000 rpm while the speed for the trickle recirculation output is 1,000 rpm. Clearly, other motor speeds might be implemented depending on the particular characteristics of the washing machine and the pump, such as 600 rpm for the trickle output.

Figure 10:
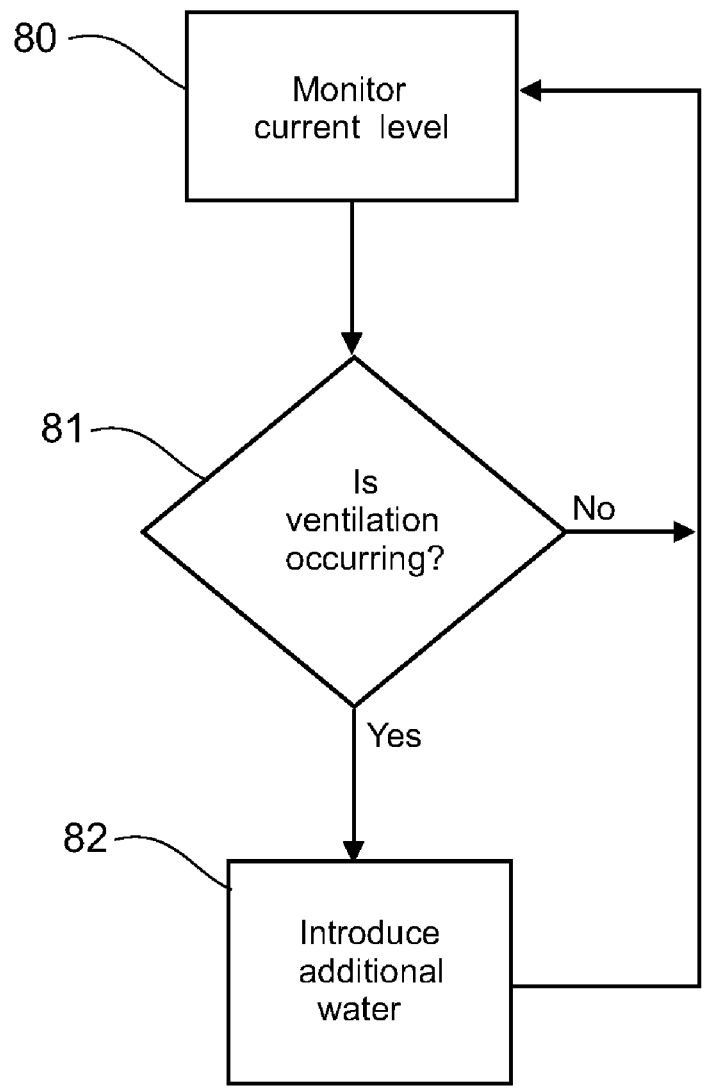
FIGS. 10 and 11 show flow diagrams of ventilation sensing and alleviation methods.

In another possible embodiment of the invention, ventilation sensing occurs during the recirculation cycle. Ventilation occurs when there isn't sufficient water in the pump resulting in the pump pumping predominantly air. Action can be taken to alleviate ventilation which can economise on recirculation water volume and/or increase soap concentration and/or reduce unnecessary noise. Recirculation occurs when the controller operates the pump 8 to pump water from the bowl 6 through the recirculation outlet 21 up the recirculation conduit 11 and up back into the bowl. The method of ventilation sensing is generally shown in FIG. 10. The CPU 51 determines whether or not the pump is ventilating by monitoring, step 80, the current required to turn the impeller. The current is sensed by a current sensor on the pump motor. Once the current drops below a certain predetermined threshold, this indicates the impeller is rotating in air, not water, i.e. it is ventilating, step 81. The CPU 51 will confirm low water level in the bowl 6 by communicating with the water level sensor 10 and level sensor circuitry 53 and using the signals/data therefrom to determine/calculate water level. When the water level drops to a level such that ventilation occurs, the CPU 51 will control the washing machine 7 to introduce additional water, step 82, into the cycle for recirculation. This is done by the CPU operating the valve inlet controller to operate the valve of the water supply inlet. Only a sufficient amount of water will be introduced to prevent ventilation therefore minimising the volume of water required. Ventilation sensing allows the reduction of the recirculation water volume for a given wash load size and absorbency. That is, a level of ventilation can be lived with in order to allow time for the water to drain through the clothes load before entering the pump.

Figure 11:
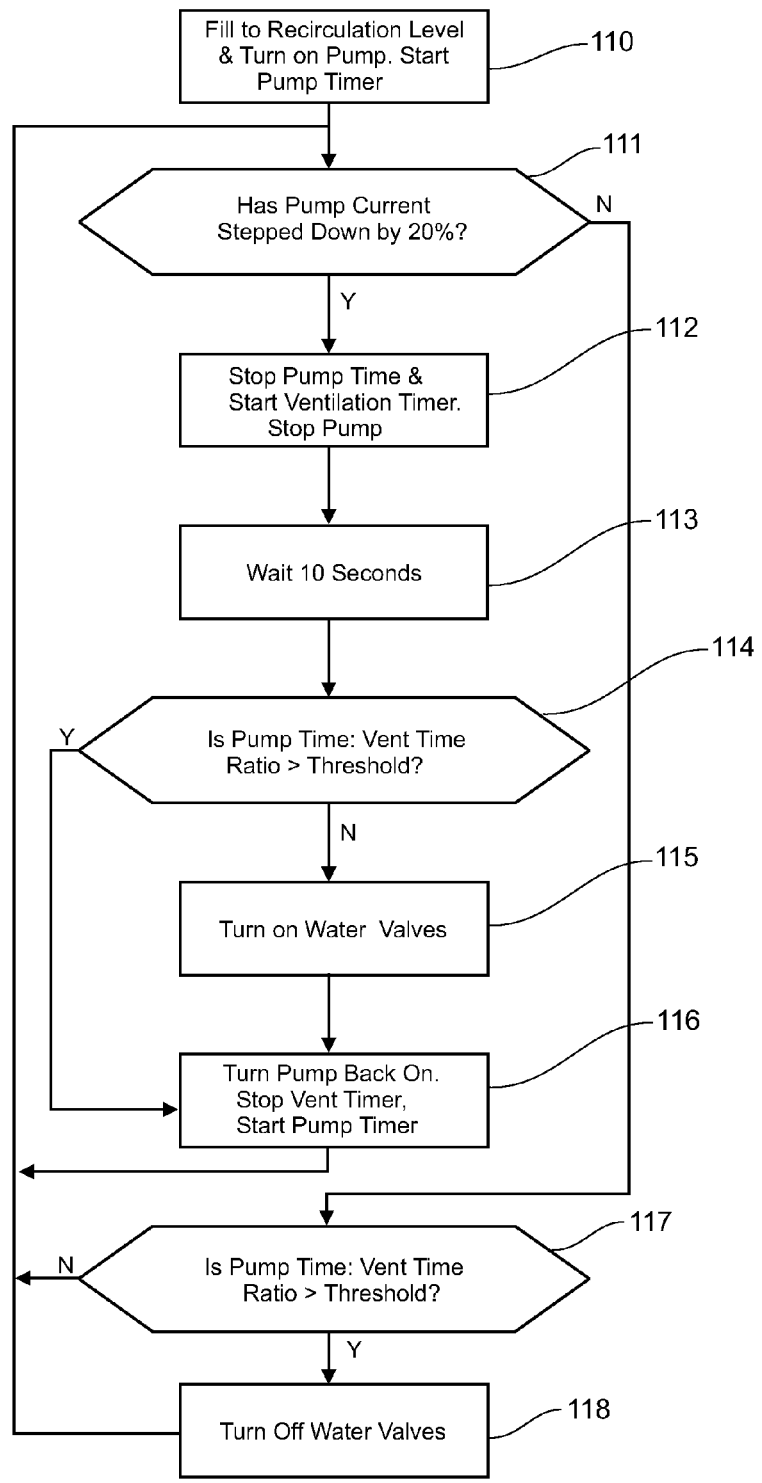

The algorithm for detecting pump ventilation and altering the pump action in response will be described in further detail with reference to the flow chart in FIG. 11. The controller 50 operates the water inlet valve 155 to fill the bowl to the recirculation level e.g. 156, which will be a water level suitable for washing or cleaning a wash load, step 110. Once filled, the pump is operated by the controller to effect recirculation, namely where water is recirculated from the bottom of the bowl through the recirculation outlet 21 up the conduit 11 and is sprayed back into the bowl to provide for water recirculation. Once this process begins, the controller starts a pump timer. The pump timer is implemented in the CPU 51 or any other suitable part of the controller. A ventilation timer is also implemented to determine how long the pump is in a ventilation mode or stage. Initially the pump timer and the ventilation timer will have a zero value. The pump timer is used to track the length of time that the pump is operating for, step 110. During the pumping and recirculation operation, the CPU 51 monitors the current drawn by the motor using the current sensor 54 outputs which provide parameters in the form of signals/data that directly or indirect indicate motor current based on sensed current. Current monitoring provides an indication of whether the ventilation is occurring or not. In step 111, the CPU 51 detects when the pump current has dropped to below a preferred (pump stop) threshold. For example, in a preferred embodiment a normal operating pump current will be defined by data stored in memory in a suitable manner. This could, for example, be one of the operating currents shown in FIGS. 16 and 17, where a suitable nominal/normal operating current is decided based on the pump speed for the required flow-rates. When the pump current drops below this value by a certain threshold the CPU 51 will detect that ventilation has occurred. For example, referring to FIGS. 16 and 17, in one embodiment, the preferred minimum flow rate might be 10 litres per minute. The pump speed required to achieve this could be determined based on the known head height of the recirculation tube. The nominal motor current drawn for this pump speed is then determined from the relationship, for example it might be 350 mA. At 10 litres per minute, it has been determined that a significant drop off of nominal current occurs when the pump begins ventilating, i.e. when it starts pumping predominantly air. When this drop off in current occurs, the CPU 51 determines that ventilation has occurred. The drop off in current can be as much as 20%-30%. Therefore, the CPU 51 uses this as the step down threshold. It would be appreciated that the 20%-30% value is one possible that could be used, and any suitable current threshold that could be applied in order to determine when ventilation occurs, based on the characteristics of the pump used and experimentation If the pump current has not dropped below the threshold, the CPU 51 operates the pump in the usual manner and determines a pump time to ventilation time ratio, step 117. The pump time and ventilation time provide respective pump time values and ventilation time values. These values reflect the incremental time counted by the respective timers. The ratio can be determined from these values. The pump time to ventilation time ratio relates to the quantity of time the pump has been in a pumping mode to the quantity of time that the pump has been in a ventilation mode, step 117. When this ratio exceeds a second predetermined (stop water flow) value or threshold it will be determined that sufficient pumping has occurred in relation to ventilation and therefore no further water is required in the bowl 6 for the moment. The CPU 51 then operates the valves 155 for the water inlet 154 to prevent further water entering the bowl 6 for the present time. The process continues by the CPU 51 implementing the step 111 again and monitoring the pump current.

If the pump current does fall below the threshold, step 112, the CPU 51 then temporarily stops pump operation. The CPU has determined that the ventilation is occurring. It also stops the pump timer and commences the ventilation timer. It then waits a preferred length of time, in this case 10 seconds (although other wait times could be implemented), step 113. The CPU, in step 114, then determines the pump time to ventilation time ratio and determines if this exceeds a first (start water flow) predetermined value or threshold as defined by data stored in memory. If it has, this indicates that too much ventilation has occurred and there is not sufficient water in the bowl to continue the recirculation process. The CPU 51 then operates the valves 155 on the water supply inlet 154, step 115, to introduce further water into the bowl 6. The CPU then continues the recirculation process by turning the pump back on into its usual mode to continue recirculation. It also stops the ventilation timer and recommences the pump timer, step 116.

In step 114, if the pump time vs. ventilation time ratio is less than a predetermined threshold or value, indicating that the level of ventilation is not considered problematic, the CPU 51 will implement directly step 116 and turn the pump back on and stop the ventilation timer and accumulate the pump timer. In this case the process of temporarily stopping the pump is sufficient for alleviating the effects of ventilation to a sufficient degree. At this point the CPU continues with step 111 and monitors the pump current for the remainder of the recirculation process.

The pump timer to ventilation timer ratio threshold can be determined based on expected performance of the machine. In one possibility, a 50% duty cycle (or pumping time to ventilation time) might be acceptable. In this case, the start water flow threshold ratio might be set at 50%. This means the ventilation time (i.e. when the pump stops pumping) could be up to 50% before the CPU is programmed to introduce more water to prevent ventilation. This means the pumping time of a wash cycle might only be 50%, which would double the length of the wash cycle. Any other suitable duty cycle could be predetermined, based on what is acceptable to the user. Where the duty cycle (i.e. pump time to ventilation time) is less, this increases the wash cycle time; however, it reduces the amount of additional water introduced. Waiting longer allows time for water to drain through clothes in the wash load back into the pump—which stops ventilation occurring. Conversely, where the duty cycle is more, more water will need to be introduced to prevent ventilation, as water will be introduced sooner. The addition of water speeds up the draining of water through the clothes back into the pump. The decision of where to set the duty cycle ratio is based on an acceptable compromise between water usage and wash cycle time.

It will be appreciated that in determining whether action is required to be taken, other alternatives to determining a pump time to ventilation time ratio and comparing this to a threshold could be used. For example, a ventilation to pump time ratio could be used. Other measures are possible. The CPU can implement any technique that determines a measure of a pump timer value with respect to a ventilation timer value and then compares this to a threshold. This might include the measure being higher or lower than a threshold. Alternatively to determining whether the measure exceeds or falls below a threshold, the CPU might determine some other relationship between the measure and a threshold to determine if action is required.

In the case of the example above, the ratio of the pump value timer to the ventilation timer value is the measure, and the relationship of this to the first (start water flow) threshold is whether or not this exceeds the first (start water flow) threshold. Similarly the relationship of this measure to the second (stop water flow) threshold is whether or not this measure exceeds the second (stop water flow) threshold.

Ventilation sensing can also occur during drain cycle to minimise pump noise. The method is the same as that for recirculation ventilation sensing, although it will be briefly described here. The pump current is monitored when running and if a current reduction is noted (say more than 20%), within a short time frame the rpm of the pump is ramped down to zero in order to stop ventilation noise and to avoid the drain gurgle associated with an immediate pump shut off. After ten seconds or some other suitable period the pump is turned back on and the current is analysed again in order to detect the reduction indicative of ventilation.

Figure 18:
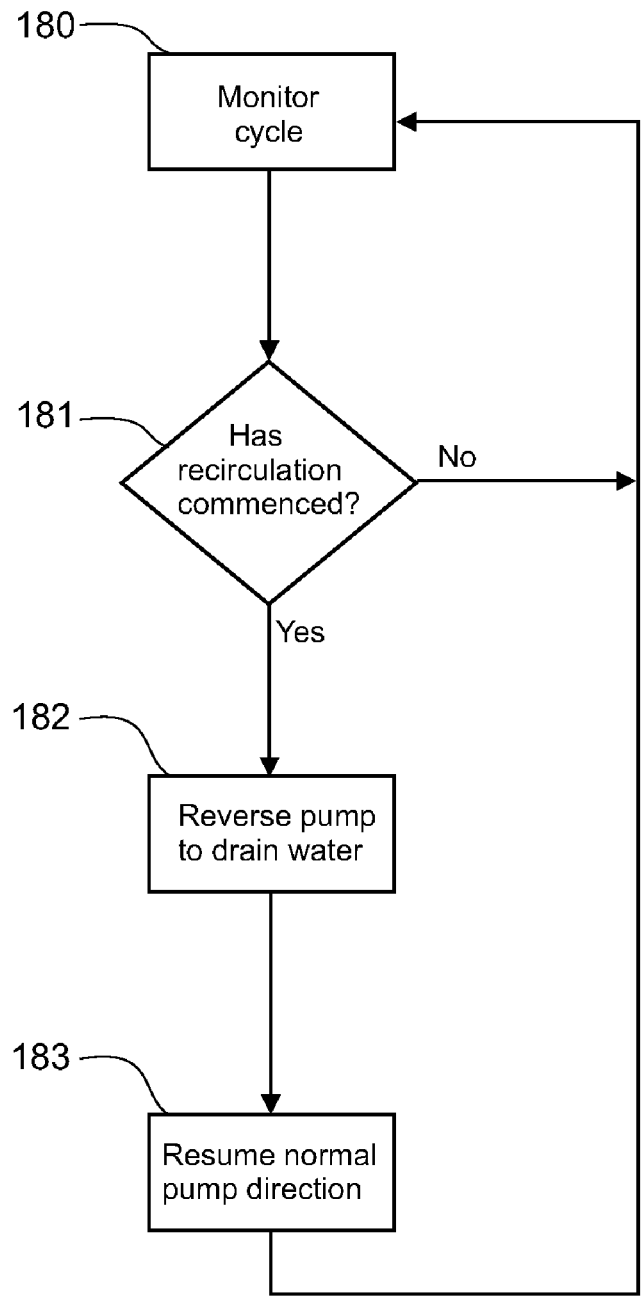
FIG. 18 is a flow diagram showing a flushing method.

In another possible embodiment the motor can be controlled to provide a mini-flush to drain of water, to remove the highly soiled residual water from the washing machine bowl 1 left over in the bowl after drain and spin cycles. The residual water includes lint, dye and detergent. Referring to FIG. 18 to do so, the CPU 51 monitors the cycle, step 180. When the recirculation cycle starts, step 181, and some fresh water has been introduced into the wash bowl 1 for recirculation, the CPU 51 momentarily operates, step 182, the motor via the motor controller 55 to quickly reverse the direction of the rotor. This rotates the impellers 36 in the opposite direction changing the direction in which the water is pumped. This change in direction operates the flapper valve 27 to close off the recirculation outlet 22 leaving the drain outlet open such that the soiled water is allowed to drain through this outlet 22. After a short time after a small amount of highly soiled water has been drained the CPU 51 operates the motor controller 55 to change the direction of the motor again to begin recirculation, step 183. This change in direction causes the impeller 36 to change direction and the associated water dynamics forces the flapper valve 27 to abut against and close off the drain outlet 22 and reopen the recirculation outlet 21.

At the end of draining, dirty water can remain in the recirculation conduit 11 which might result in recirculation of dirty water in the next recirculation cycle. In another possible embodiment of the invention, is to operate the pump to drain the bowl 6 and continue the drain pump for a period after wash water for recirculation is introduced in order to purge out the dirty water held in the recirculation conduit 11. The length of time to continue pump operation would be determined from conduit head height, and motor parameters to determine how long is needed to clear the recirculation conduit 11.

Figure 12A:
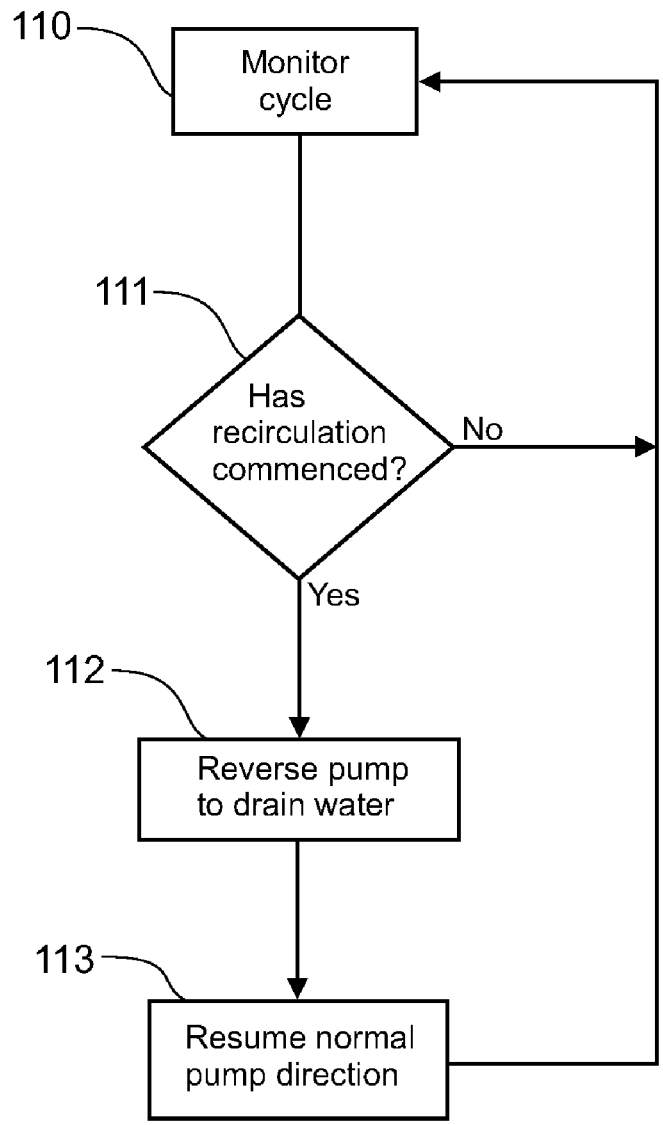
FIGS. 12a and 12b show flow diagrams of impeller blockage dislodging methods.

In another possible embodiment of the invention, the impeller 36 can be controlled to assist in dislodging jams or blockages in the pump 8. When some type of particle is lodged in the impeller 36 or between the impeller and rotor cap 34, the motor speed will drop to or close to zero. Referring to FIG. 12a the CPU 51 can detect this drop in speed via the current sensor 54, step 100, and infer that some type of jam or blockage has occurred. The pump speed detection has been described previously and does not require further explanation here. The CPU 51 will then invoke a blockage dislodging progran, step 102, which controls the pump motor via the motor controller 55 to dislodge the blockage. One such program could be to step the motor backwards by controlled application of current to sequential stators e.g. 40*a*-40*c* in the stator 38. Reversing the rotor 32 in this stepped manner could dislodge the blockage. The speed and number of steps can be controlled as required. After stepping the rotor in reverse the CPU 51 can control the motor to rotate in a forward direction again, step 103, and monitor the current sensors 54 to determine whether the motor speed has resumed to a normal level, thus indicating that the blockage has been dislodged.

In another alternative, the pump speed is determined from commutation rate of the brushless DC motor. As known to those skilled in the art, a brushless DC motor has electronic commutation. The software and/or electronics that operate the commutation of the excitation applied to the coils. As described earlier, by using hall sensors or sensing back emf in the unenergised coils, the position of the rotor can be determined, and from this the rate of commutation and/or the speed of the rotor determined. This correlates to the speed of the pump.

Figure 12B:
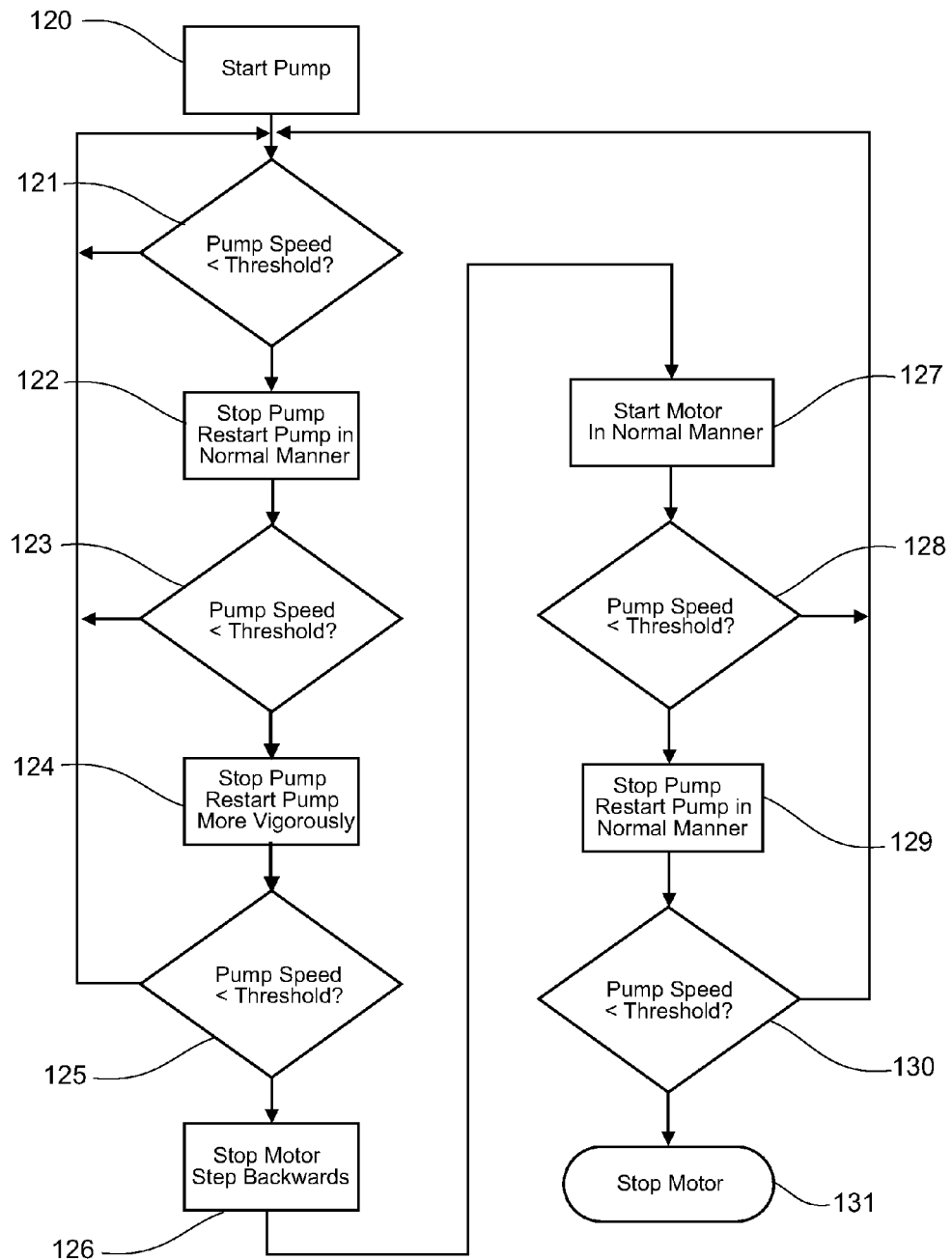

A particular example of an operation in response to the detection of a blockage will be described with reference to FIG. 12*b*. The controller starts the pump to carry out an operation of the washing machine 7 in the usual manner, step 120. The controller monitors the speed of the motor of the pump by calculating the speed from output from commutation rate. Other techniques could be envisaged by those skilled in the art. The CPU 51 determines if the pump speed as measured by the commutation rate has dropped below a threshold. For example, this threshold might be zero, or some other preferred threshold. For example, a speed slightly above zero could be specified in case there is a blockage that has not completely ceased impeller movement. The threshold is defined by data stored in memory 51 or elsewhere. If the pump speed has not dropped below the threshold, step 121, then the pump continues in the normal manner. However, if the pump speed has dropped below the threshold then the controller stops operation of the pump and then restarts pump in the usual manner, step 122. For example this is by controlling the motor controller 17 to apply an excitation voltage to the motor of the pump, the voltage being the usual voltage for starting the pump. This is an excitation voltage that promotes normal average current in the motor to provide a normal starting torque. The excitation voltage is any energisation that is used to operate the motor, such as a Pulse Width Modulation voltage. In many instances, this operation will be sufficient to dislodge the debris or blockage and continue the pump in the usual manner.

The CPU 51 then monitors the pump speed again after restarting the pump, step 123, and determines if the pump speed is still below the threshold. If it is not then this indicates the pump is operating normally and operation continues as normal. However, if the CPU 51 determines that pump speed has dropped below the threshold then the CPU stops the pump again. It then restarts the pump more vigorously. Preferably, this is by controlling the motor controller to apply a higher excitation voltage required than normal for starting the pump, step 124. This is an excitation voltage that promotes higher than normal average current in the motor to provide a higher than normal starting torque. Again, in some circumstances this will be sufficient to dislodge the blockage. In step 125, the CPU again monitors the pump speed and if this is above the threshold then the pump operation continues as normal. However, if the blockage has not yet dislodged and the pump speed is below the threshold then the controller 50 will stop the motor again, and step the motor backwards, step 126. As the motor of the pump can be operated as a stepper motor, the motor can be operated backwards in a step-wise fashion in a manner known to those skilled in the art. Preferably, the motor will be stepped back 180°, although any other degrees of stepping could be implemented, step 126. In step 127, the controller restarts the motor of the pump 8 using a normal excitation, or an elevated excitation as an option. Again, the backwards stepping and restarting might be sufficient to dislodge the blockage.

In step 128, the CPU again monitors the motor speed, and if it is above the threshold then operation continues as normal. However if not, it is determined that the blockage still exists. In step 129, in this case the CPU 51 stops the pump and then restarts it again using a normal, or optionally elevated excitation. Once more, the CPU monitors the pump current and determines if the blockage still exists, step 130. If the pump speed is below the threshold, then the blockage is determined as still existing. In this case the process will stop and the CPU will stop the pump and stop operation of the washing machine and provide a warning to indicate that there is a fault that requires a technician, step 131.

It will be appreciated that it may not be necessary to implement all the steps of this process in a regime for overcoming a blockage. The CPU 51 might be programmed to only carry out one or a selection of the steps. Alternatively, additional steps might be added, or variations to operation of the pump in order to attempt to dislodge a blockage.

As shown in FIG. 6, the pump housing cap 42 comprises a leak flow recirculation tube 43*d*. This tube 43*d* provides a conduit between the pump housing 20 and volute to provide fluid communication with the inside of the bowl 6. The leak flow recirculation tube 43*d* is provided to reduce unseating forces that can be present on the flapper valve 27 during operation. Water dynamic and static forces in the housing 20 during operation can upset the seating of the valve 27, such that it does not seal completely when it is abutting against either the drain 22 or recirculation outlets 21, therefore allowing undesirable leakage into either the recirculation 21 or drain 22 conduits. For example, if during a drain cycle the flapper valve 27 has not seated properly to fully seal off the recirculation opening 21, drain water can flow through the recirculation conduit 11 and spill on to the clothes within the bowl 6 or during the spin cycle be shaken on to the cabinet/wrapper 1 interior and down to the floor. The leak flow recirculation tube 43*d* addresses this problem by equalising the pressure outside the pump housing 20 with the pressure in the recirculation conduit 11 such that water level in the conduit 11 does not rise substantially above the water level in the washing machine bowl 6.

The leak flow recirculation tube 43*d* provides fluid communication between the interior of the recirculation outlet 21 and the outside of the housing. As shown in FIG. 6, the leak flow tube 43*d* vents into the volute defined by the flower shaped hood 45 and the cap 42 wall 43. Other alternative are possible. For example, the leak flow tube could vent directly into the bowl 6, or could vent directly into the cap aperture 43*a*. The leak flow tube 43*d* can vent anywhere where there is a lower pressure that provides equalisation. In the present embodiment, as described earlier, the coercing of the water flow from the aperture 43*a* to the leak flow tube 43*d* creates a lower pressure above the leak flow tube which enables equalisation. This equalises the pressure between the volute and the interior of the recirculation outlet.

In a preferred embodiment the leak flow recirculation tube 43*d* aligns and corresponds with an aperture in the recirculation outlet 21, which allows for pressure equalisation directly between the recirculation outlet 21 and the volute 43*b*. This equalisation provides for approximate pressure equalisation between the water in the bowl 6 and the water in the recirculation outlet 21 and conduit 11 when the flapper valve 27 closes of the outlet 21. The leak flow recirculation tube 43*d* is in fluid communication with the volute which itself is in fluid communication with the bowl 6 via the gap created between the volute wall and the hood and also the "V" notches 42*d* and 42*c* in the volute wall. There is some pressure drop between the bowl itself and the volute, such that the leak flow recirculation tube does not quite equalise the pressure of the recirculation outlet 21/conduit 11 with the bowl 6 pressure, although it approximately equalises the pressure in both. The pressure differential is minimal which means that the water in the conduit 11 is prevented from rising above the water level in the bowl. The pressure in the cap/hood cavity is lower than that at the equivalent height in the bowl itself.

Further, the leak flow recirculation tube provides for reduction in flapper valve 27 unseating forces to reduce leakage and improve sealing. This is because it will lower the height of the water in the recirculation tube and hence the pressure acting on the back of the flapper trying to unseat it. The leak flow recirculation tube 43*d* can also be flushed when the impeller stops. The head of water in the recirculation pipe flows back and up through the leak flow recirculation pipe 43*d* to remove lint and other particles, as shown by the arrow in FIG. 15. At the end of the recirculation phase, when the impeller stops rotating, water that was in the recirculation hose returns through gravity back into the pump housing 20. The majority of the water flow is directly through the recirculation outlet 21 but a portion will be flushed up through the leak flow recirculation tube 43 along the hood bulb 47 and some will be flushed through the aperture 48 in the bowl.

In another possible embodiment of the invention, a second set of vanes are formed on the under-side of the impeller 36 as shown in FIG. 13. The impeller as shown in FIG. 13 includes a generally circular body portion 130 which comprises a top surface 131 and a bottom surface 132. The top surface comprises preferably four impeller blades or vanes 133*a*-133*d* a moulded bearing cavity 134 so that the impeller can be installed on an axle of the rotor. The main body is partially concave upwards. The bottom surface of the impeller comprises a recess 135 and eight impeller vanes or blades 136*a*-136*h*. The impeller blades 133*a*-133*d* transfer or move water upon rotation of the impeller. This provides for transfer of water to the drain or recirculation outlets as required based on the direction. If the impeller rotates clockwise the water will be moved and forced into the drain outlet 22 and if the impeller moves counter-clockwise the water will be moved into the recirculation outlet 21.

The bottom surface is convex in shape and is commensurate with the concave shape of the bearing 134. This allows for the impeller to rotate on the bearing with a small degree of tolerance. However foreign objects and debris may become lodged between the bottom surface of the impeller 132 and the top concave surface of the bearing 134. This can affect the operation of the impeller and the pump. During operation the vanes create a whirlpool or vortex in the area between the impeller and the bearing 134. There is no inlet to this, so the fluid will flow radially rather than axially. If there is debris in this whirlpool, for example a sand particle, that is denser than water, it will be thrown outwards due to the whirlpool effect or vortex as it is heavier than the corresponding water particle that will take its place. The vortex created effectively emits particles from between the impeller and the bearing through a centrifugal action. This improves movement of the impeller if there is a particle lodged between the two surfaces and reduces shaft, seal and bearing wear, thereby prolonging the pump life. The centrifugal action bought about by the rotation of these vanes emits foreign objects from between the impeller and the rotor cap 34 and reduces shaft seal and bearing wear, thereby prolonging the pump life.

The vanes 136*a*-136*i* can be changed in number, height and spacing to improve the removal of debris as required. The vanes a configured to create a suitable drag to effect a vortex.

Figure 14A:
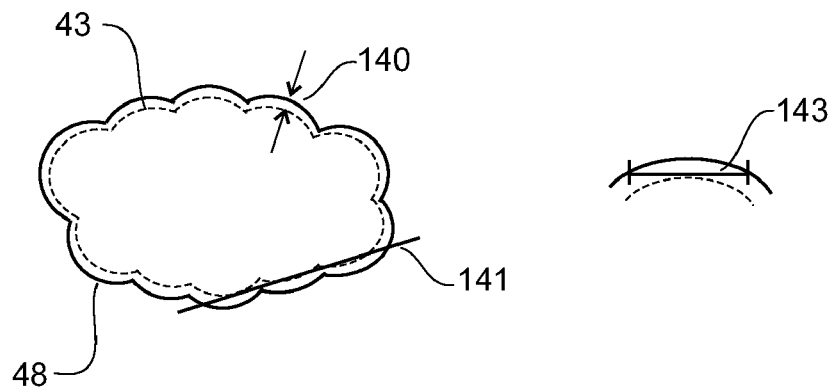
FIGS. 14a to 14c show two embodiments of the volute wall.
Figure 14B:
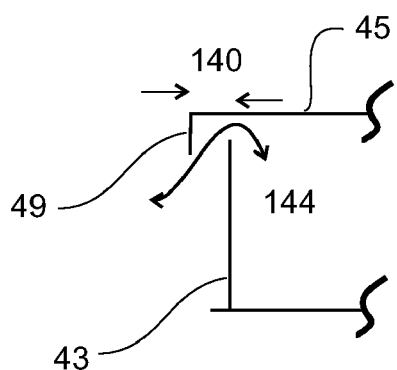
Figure 14C:
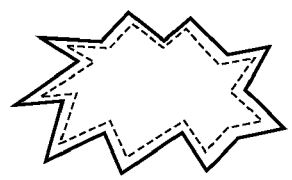

Referring to FIGS. 6 and 14*a*, 14*c* the flower shaped walls 43 extending from the top of the housing 42 to produce the volute, includes V shaped notches 42*c*, 42*d* in either end. These notches allow the inflow of water to prime the pump prior to the water level reaching the height of the flower shaped wall 43. The flower shaped wall 43 in combination with the corresponding flower shaped hood 45 provides a filtering mechanism. The moulded flower shape of the hood 45 corresponds with that of the volute wall 43 although it is marginally wider and comprises a lip 49 that extends partially over the wall 43. This provides a flower shaped gap 140 (see FIGS. 14*a*, 14*c*) around the perimeter of the volute wall.

This arrangement allows water to flow into and out of the volute (see arrow 144 in FIG. 14*c* and also FIG. 15). However, the shape of the perimeter opening 140 formed by the hood 48 and the volute wall 43 limits the size of foreign particles that can enter the volute. For example referring to the elongated foreign article 141, an article that is too long will not fit in the gap as the curved walls limit the maximum straight length 143 provided in the gap. This in turn limits the length/size of particles that can enter the volute between the hood 45/wall 43 gap 140. This provides for some filtering of the water.

FIG. 14*a* shows just one possible embodiment of the wall that is preferred. Any suitable irregular shape of the volute wall could be provided. Another example is shown in FIG. 14*b*, which is triangular in shape. What is required is having an outer exterior profile or shape of wall 43 that overall is substantially non-planar with a corresponding lip on the hood 45 with a corresponding profiled inner surface facing the exterior profiled wall 43. This could be provided by curved walls, angular walls or any other suitable geometry. The irregular curves or angles are arranged such that the maximum length e.g. 143 in the gap between the volute wall and the hood lip 49 is small enough to prevent particles of a greater length entering through the gap into the volute. This maximum length can be designed as any considered suitable for the particular application. It will be appreciated that if the maximum length in the gap is made very small, this will prevent most particles from entering, but may also restrict water flow through the gap and into the volute to an undesirable level. Making the maximum length in the gap too long will allow more water in, but will also may let through particles of an unacceptable size.

It will be appreciated that it is the profile of the space or gap 140 that provides a filtering effect, which is achieved by the combination of the profile or shape of the inside surface of the lip 49 on the hood 45 and the profiled exterior shape of the wall 43. The interior shape of the volute wall and the exterior shape of the hood and lip are not critical.

The profiled bulb 47 is provided to remove air bubbles from the pump which may reduce performance and give false ventilation messages to the controller 50. If there is air in the pump 8 that cannot escape, no water can enter as there is air in the way, so no water can be pumped. If the pump empties of water naturally (e.g. dries up over time), the air must be able to escape when new water comes in. If it cannot, air bubbles will form. For example, when the air is stirred up in to the water volume, these individual bubbles combine to form a large bubble. If this bubble sits on top of the impeller and gets caught in the vortex, it cannot escape. The pump cannot pump water, even if more water enters the system, say through a rinse cycle. Ventilation sensing senses the current drop when the pump begins pumping air. If this air happens to be an air bubble when there is water left in the pump, the controller will incorrectly detect ventilation and stop pumping. Any such air bubbles in the pump rise through the opening and into the bulb 47 that is situated above the water level in the pump. The aperture 48 in the bulb 47 allows for any air bubble in the bulb to vent through into the washing machine bowl 1. It also allows the bubble to rise before it reaches the impeller or once it breaks free. The profile bulb 47 also allows lint streams to escape from the leak flow recirculation tube 43*d* by providing extra clearance between the top of the conduit 43*d* and hood 45. That is, if lint or other foreign objects form into a ball or otherwise, they can be accommodated by the extra volume provided by the bulb 47. This allows the bigger objects to reside temporarily in the bulb and subsequently escape the from hood, rather than getting jammed which would happen if the hood were flat.

A washing machine can incorporate one or a combination of two or more of the features described above to improve the operation of the washing machine.

The invention claimed is:

1. A washing machine comprising:
   a bowl adapted to hold water,
   an inlet with a valve adapted for connection to a water supply, the inlet and valve allowing controlled introduction of water into the bowl when the inlet is connected to a water supply,
   a variable speed pump adapted to recirculate water within the bowl,
   a sensor adapted to measure one or more parameters indicative of current drawn by the pump during operation,
   a controller apparatus operatively connected to said pump and said sensor, and configured to:
   (a) compare said measure of said current drawn by said pump during operation to a threshold current, said current being below said threshold indicative of when said pump is ventilating,
   (b) increment a first timer when said pump is pumping,
   (c) increment a second timer when said pump is ventilating,
   (d) determine a ratio between said first and second timers, and
   (e) operate said valve to prevent the flow of water into said bowl when said ratio between said first and second timers exceeds a timer threshold.

2. A washing machine as claimed in claim 1, wherein said timer threshold is determine by desired total wash-time and water economy.

3. A washing machine as claimed in claim 1, wherein said timer threshold is less than 100%.

4. A method of controlling a washing machine having a bowl to hold water, an inlet valve for allowing the controlled introduction of water to the wash bowl, a variable speed pump adapted to recirculate water within the bowl, a sensor adapted to measure one or more parameters indicative of current drawn by the pump during operation and a controller connected to said pump and said sensor, comprising the steps of
   (a) compare said measure of said current drawn by said pump during operation to a threshold current, said current being below said threshold indicative of when said pump is ventilating,
   (b) increment a first timer when said pump is pumping,
   (c) increment a second timer when said pump is ventilating,
   (d) determine a ratio between said first and second timers, and
   (e) operate said valve to prevent the flow of water into said bowl when said ratio between said ratio between said first and second timers exceeds a timer threshold.

5. A method of controlling a washing machine as claimed in claim 4, wherein said timer threshold is determined by desired total wash-time and water economy.

6. A method of controlling a washing machine as claimed in claim 4, wherein said timer threshold is less than 100%.

* * * * *

UNITED STATES PATENT AND TRADEMARK OFFICE
CERTIFICATE OF CORRECTION

| | | |
|---|---|---|
| PATENT NO. | : 7,810,362 B2 | Page 1 of 1 |
| APPLICATION NO. | : 11/556827 | |
| DATED | : October 12, 2010 | |
| INVENTOR(S) | : Jonathan David Harwood et al. | |

It is certified that error appears in the above-identified patent and that said Letters Patent is hereby corrected as shown below:

Column 18, Line 65 "detennined" should be -- determined --

Column 26, Line 31 "said ration between said ratio between"

should be -- said ratio between --

Signed and Sealed this

Seventeenth Day of May, 2011

David J. Kappos
*Director of the United States Patent and Trademark Office*